(12) United States Patent
Itakura et al.

(10) Patent No.: US 6,711,551 B1
(45) Date of Patent: Mar. 23, 2004

(54) INFORMATION PROVIDER, TERMINAL AND SYSTEM AND RECORDING MEDIUM FOR THE TERMINAL

(75) Inventors: Yuichiro Itakura, Chiba (JP); Yuichiro Tsutsui, Tokyo (JP); Nobuyuki Fujita, Kanagawa (JP)

(73) Assignee: Netzero, Inc., Westlake Village, CA (US)

( * ) Notice: Subject to any disclaimer, the term of this patent is extended or adjusted under 35 U.S.C. 154(b) by 0 days.

(21) Appl. No.: 09/206,385

(22) Filed: Dec. 7, 1998

Related U.S. Application Data

(63) Continuation of application No. PCT/JP97/01907, filed on Jun. 5, 1997.
(60) Provisional application No. 60/019,452, filed on Jun. 11, 1996.

(30) Foreign Application Priority Data

Jun. 5, 1996 (JP) .............................. 8-163679

(51) Int. Cl.[7] .............................................. G06F 17/60
(52) U.S. Cl. ............................ 705/26; 705/39; 709/217
(58) Field of Search ............................. 705/26, 27, 51, 705/64, 39; 709/217

(56) References Cited

U.S. PATENT DOCUMENTS

| 5,019,963 A | 5/1991 | Alderson et al. |
| 5,105,184 A | 4/1992 | Pirani et al. |

(List continued on next page.)

FOREIGN PATENT DOCUMENTS

| CA | 2153727 A1 | * 2/1996 | ............ G06F/17/60 |
| EP | 0 822 535 A2 | 2/1998 | |
| JP | 5-233656 | 9/1993 | |
| JP | 6-243150 | 9/1994 | |
| JP | 9-500470 | 1/1997 | |
| JP | 9-83678 | 3/1997 | |
| WO | WO 95/16791 | 6/1995 | |
| WO | 0 749 081 A1 | 12/1996 | |
| WO | WO 97/21183 | 6/1997 | |
| WO | WO 97/40447 | 10/1997 | |
| WO | WO 97/40514 | 10/1997 | |
| WO | WO 97/41673 | 11/1997 | |
| WO | WO 98/35300 | 8/1998 | |
| WO | WO 00/3008 | 5/2000 | |

OTHER PUBLICATIONS

Wheelwright, Geoffrey: "Coming Soon: Goods Made to Order, via the Internet", Financial Times, London, Jun. 5, 1996.*

Terauchi, Implementation and Evaluation of Electronic Payment System, IPSJ SIG Notes, vol. 96, No. 40, pp. 97–103, May 16, 1996.

(List continued on next page.)

Multimedia Computing, Case Studies from MIT Project Athena, date unknown, pp. 17–21, 201–202, Addison–Wesley Publishing Company.

*Primary Examiner*—Jeffrey A. Smith

(57) ABSTRACT

To provide a terminal with which a user can safely make payments using a communication network. The terminal has a browser for communicating with the World Wide Web or other public computer network and a message viewer for communicating with a private network. The browser allows for ordering goods from a host computer connected to the World Wide Web, for receiving a bill for the goods from the World Wide Web, and for transmitting the bill to the message viewer. The message viewer allows for paying the bill through the private network.

18 Claims, 22 Drawing Sheets

U.S. PATENT DOCUMENTS

| | | | |
|---|---|---|---|
| 5,305,195 A | | 4/1994 | Murphy |
| 5,319,455 A | | 6/1994 | Hoarty et al. |
| 5,408,527 A | * | 4/1995 | Tsutsu |
| 5,446,919 A | | 8/1995 | Wilkins |
| 5,504,675 A | | 4/1996 | Cragun et al. |
| 5,592,378 A | * | 1/1997 | Cameron et al. ........... 395/227 |
| 5,594,944 A | * | 1/1997 | Ogata et al. |
| 5,636,346 A | | 6/1997 | Saxe |
| 5,643,088 A | | 7/1997 | Vaughn et al. |
| 5,671,279 A | * | 9/1997 | Elgamal ..................... 380/23 |
| 5,699,528 A | * | 12/1997 | Hogan |
| 5,715,399 A | * | 2/1998 | Bezos ......................... 705/27 |
| 5,717,923 A | | 2/1998 | Dedrick |
| 5,721,827 A | | 2/1998 | Logan et al. |
| 5,724,521 A | | 3/1998 | Dedrick |
| 5,727,163 A | * | 3/1998 | Bezos ......................... 705/27 |
| 5,740,549 A | | 4/1998 | Reilly et al. |
| 5,745,556 A | * | 4/1998 | Ronen ........................ 379/127 |
| 5,757,917 A | * | 5/1998 | Rose et al. .................. 380/25 |
| 5,761,662 A | | 6/1998 | Dasan |
| 5,768,521 A | | 6/1998 | Dedrick |
| 5,794,210 A | | 8/1998 | Goldhaber et al. |
| 5,809,242 A | | 9/1998 | Shaw et al. |
| 5,812,784 A | | 9/1998 | Watson |
| 5,815,657 A | * | 9/1998 | Williams et al. ............ 395/186 |
| 5,815,665 A | * | 9/1998 | Teper et al. |
| 5,822,737 A | * | 10/1998 | Ogram ........................ 705/26 |
| 5,823,879 A | | 10/1998 | Goldberg et al. |
| 5,862,220 A | * | 1/1999 | Perlman ..................... 380/21 |
| 5,905,736 A | * | 5/1999 | Ronen et al. ............... 370/546 |
| 5,913,040 A | | 6/1999 | Rakavy et al. |
| 5,915,022 A | * | 6/1999 | Robinson et al. |
| 5,918,014 A | | 6/1999 | Robinson |
| 5,933,811 A | | 8/1999 | Angles et al. |
| 5,946,646 A | | 8/1999 | Schena et al. |
| 5,946,664 A | | 8/1999 | Ebisawa |
| 5,959,623 A | | 9/1999 | van Hoff et al. |
| 5,995,606 A | * | 11/1999 | Civanlar et al. ............ 379/201 |
| 6,009,409 A | | 12/1999 | Adler |
| 6,009,410 A | | 12/1999 | LeMole et al. |
| 6,026,368 A | | 2/2000 | Brown et al. |
| 6,036,601 A | | 3/2000 | Heckel |
| 6,085,229 A | | 7/2000 | Newman et al. |
| 6,252,869 B1 | * | 6/2001 | Silverman ................... 370/352 |

OTHER PUBLICATIONS

Jeff Moad, Tossing the boxes (electronic software distribution– includes related article on Electronic Licensing and Security Initiative), PCWeek, v14n3 p. 107(2) (from DialogClassic Web(tm) file 275).*

Carl, Bookseller's online ambitions—Amazon.com knows competitors can't be far behind, WebWeek, v1n6 p. 17,20 (from DialogClassic Web), Oct. 1995.*

Michelle V. Rafter, Web sites that work: shop til' you drop, Online Access, v11n5 p43 (from DialogClassic Web(tm) file 233), May 1996.*

Amazon.com, Inc., Earth's Biggest Selection, from URL http://www.amazon.com/ (a total of 9 pages), 1996–2001.*

Julia Angwin, Cashing in on the net: unique offerings will draw customers, San Francisco Chronicle (SF) (from DialogClassic Web(tm) file 640), Jul. 1996.*

Nikkei Communication The April 1 issue, 1996, pp. 82–84, Apr. 1, 1996 (Jan. 4, 1996).

Nikkei Communication June issue, 1996, pp. 176–181, Jun. 15, 1996.

Halliday, The Trail Guide to Prodigy, 1995, pp. 82,86, 114, 130, 135, 139, 152, 191, 195, 202.

Miller, Using Prodigy, 1995, pp. 26–31, 75, 80, 89, 103, 132, 189, 198, 219, 268, 307.

Mastering Netscape 2.0, date unknown, pp. 2, 66–67, 69–73, 246–247, 288–290, 341, 590, 432–436, 583, 591–594, Hayden Books, Indeanapolis, Indiana.

* cited by examiner

FIG.7

| STORE DATABASE 33 | |
|---|---|
| STORE CODE | ADDRESS |
| A | ADDRESS 1 |
| B | ADDRESS 2 |
| ⋯ | ⋯ |
| X | ADDRESS X |

FIG. 8

MESSAGE USER DATABASE 34

| MESSAGE USER ID | MESSAGE USER PASSWORD | PROVIDER ID | PROVIDER USER ID | DISPLAYED TIME | DATE OF BIRTH | SEX | MARRIED | OCCUPATION | ADDRESS | CREDIT CARD NUMBER | LIMITA-TION | NAME | LAST COMMUNI-CATION TIME |
|---|---|---|---|---|---|---|---|---|---|---|---|---|---|
| XXX | YYY | A | ZZZ | 1:00:15 | 1968.6.2 | MALE | NO | CORPORATION | SHINJYUKU-KU TOKYO | 2934-5612-6847-5587 | 98/6 | TARO YAMADA | 1996.3.31 23:00 |
| AAA | BBB | B | CCC | 0:15:34 | 1967.1.7 | FEMALE | YES | FREE | ICHIKAWA CHIBA | 4879-5517-5001-6901 | 97/9 | ICHIRO TANAKA | 1996.4.4 21:15 |
| OOO | PPP | A | QQQ | 15:23:56 | 1980.11.24 | MALE | NO | STUDENT | SHIBUYA-KU TOKYO | 9540-1735-9927-0513 | 97/4 | JIRO SUZUKI | 1996.4.22 00:45 |
| ......... | ......... | ......... | ......... | ......... | ......... | ......... | ......... | ......... | ......... | ......... | ......... | ......... | ......... |

FIG. 9

TRANSMITTAL CONDITION DATABASE 36

| MESSAGE URL | INDIVIDUAL LIMIT TYPE | INDIVIDUAL LIMIT | TOTAL LIMIT TYPE | TOTAL LIMIT | DISPLAYED TIME | AGE | SEX | MARRIED | OCCUPATION | ADDRESS |
|---|---|---|---|---|---|---|---|---|---|---|
| --- | DAY | 3 | DAY | 1000 | --- | 18-22 | MALE | NO | CORPORATION | TOKYO |
| --- | TOTAL | 10 | MONTH | 10000 | --- | --- | FEMALE | YES | STUDENT | KANAGAWA |
| --- | MONTH | 8 | MONTH | 500 | 1996.1.1 /12:00 | --- | --- | NO | --- | KANTO |
| ... | ... | ... | ... | ... | ... | ... | ... | ... | ... | ... |

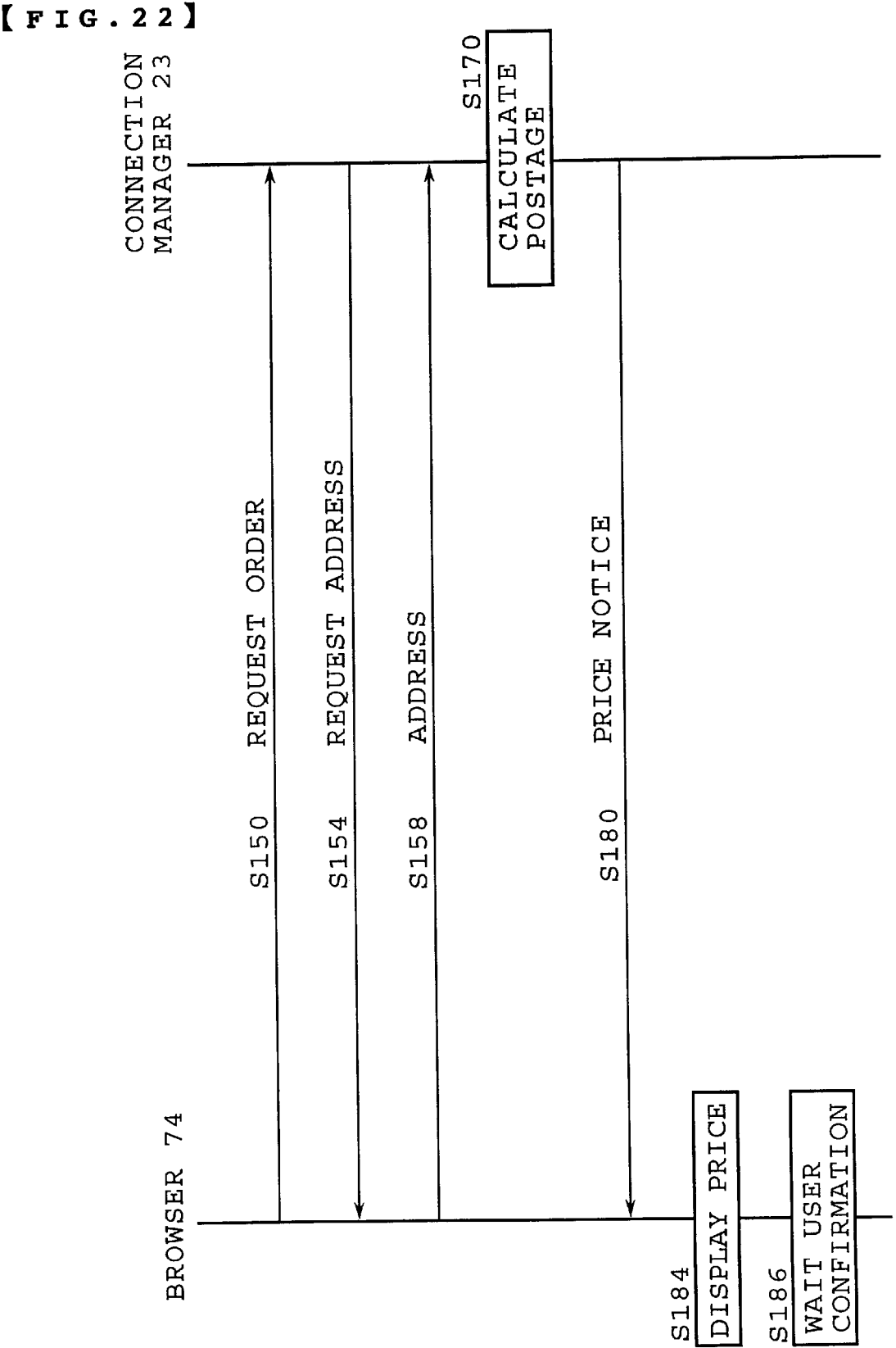

INFORMATION PROVIDER, TERMINAL AND SYSTEM AND RECORDING MEDIUM FOR THE TERMINAL

RELATED APPLICATION INFORMATION

This application is a continuation of International Patent Application No. PCT/JP97/01907 filed Jun. 5, 1997 and designating the United States of America; which derives priority from U.S. Provisional Patent Application No. 60/019,452 filed Jun. 11, 1996 and Japanese Patent Application No. H8-163679 filed Jun. 5, 1996.

This application is related to:

Appln. No. H8-9521 filed Jan. 23, 1996;
Appln. No. H8-67278 filed Feb. 28, 1996;
Appln. No. H8-139689 filed May 10, 1996;
Appln. No. H8-139690 filed May 10, 1996;
Appln. No. H8-163679 filed Jun. 5, 1996;
all of which are hereby incorporated by reference.

This application is also related to:

application Ser. No. 09/125,833 filed Feb. 26, 1997, entitled "Communication System Capable of Providing User with Picture Meeting Characteristics of User and Terminal Equipment and Information Providing Device Used for the Same," now U.S. Pat. No. 6,157,946, issued Dec. 5, 2000;

application Ser. No. 09/633,407 filed Aug. 7, 2000, entitled "Advertising Supported Internet Access Service," now pending;

application Ser. No. 09/125,894 filed Aug. 27, 1998, entitled "Communication System for Distributing Such Message as Advertisement to User of Terminal Equipment," now U.S. Pat. No. 6,351,745, issued Feb. 26, 2002;

application Ser. No. 09/188,571 filed Nov. 10, 1998, entitled "Message Searching System and Terminal," now U.S. Pat. No. 6,356,893, issued Mar. 12, 2002; and application Ser. No. 09/276,708 filed Mar. 26, 1999, entitled "Terminal Which Stores Information on Communication Network in Local Memory Automatically," now pending.

BACKGROUND OF THE INVENTION

1. Field of the Invention

This invention relates to a display system, which displays information obtained from a communications network, such as World Wide Web, and a method for displaying such information.

2. Description of Related Art

The World Wide Web users can communicate with a variety of host computers in World Wide Web through a host computer (information provider) offered by a provider. Recently, many virtual shops are formed in World Wide Web. Users can buy goods by mail-order through World Wide Web. Programs and data are also sold through World Wide Web. User can pay for the goods by the credit card by transmitting the credit card number and the expiration date.

However, information is transferred through many host computers in World Wide Web, and the security for the information is poor. Especially, when transmitting the credit card number and the expiration date through World Wide Web, such information can be misused, which is undesirable to the user. Therefore, this invention aims to solve the problem and to provide a terminal, information provider, system and recording medium, which allow safe payment in mail-order business through a computer communications network.

SUMMARY OF THE INVENTION

To overcome the above issue, according to the first aspect of the present invention, a terminal has a browser for communicating with World Wide Web, and a message viewer for communicating with a private network. The browser includes means for ordering goods from a host computer connected to World Wide Web, means for receiving a bill for the goods from World Wide Web, and means for transmitting the bill to the message viewer. The message viewer pays the bill through the private network.

According to the second aspect of the present invention, the message viewer further includes means for receiving information indicative of payment completion from the private network. The message viewer transmits the information indicative of payment completion to the browser. The browser notifies the host computer of the payment completion through World Wide Web.

According to the third aspect of the present invention, the terminal has a browser for communicating with World Wide Web, and a message viewer for communicating with a private network. The message viewer orders goods through a private network and receives a bill for the goods from the private network. The message viewer pays the bill through the private network and transmits the information that the order and the payment have been completed to the browser. The browser notifies World Wide Web of the completion of the order and the payment.

According to the fourth aspect of the present invention, the message viewer transmits a credit card number and an expiration date of the terminal user to the private network during the payment.

According to the fifth aspect of the present invention, the information provider has a gateway through which a terminal accesses World Wide Web, a connection manager for managing the communication which is conducted through the gateway, and a message manager connected to a payment system for paying through a private line. The gateway transmits goods order input through the terminal to a host computer connected to World Wide Web and transmits a bill for the goods from the host computer to the terminal through World Wide Web. The message manager includes request means for requesting through the private line the payment system to pay the bill.

According to the sixth aspect of the present invention, the message manager receives information indicative of payment completion from the payment system. The gateway notifies the host computer of the payment completion through World Wide Web.

According to the seventh aspect of the present invention, the information provider has a gateway through which a terminal accesses World Wide Web, a connection manager for managing the communication which is conducted through the gateway, and a message manager connected to a payment system for paying through a private line. The message manager transmits goods order, which was input through the terminal, to the payment system, transmits a bill for the goods from the payment system to the terminal, and requests the payment system through the private line to pay the bill. The message manager receives information indicative of payment completion from the payment system. The gateway notifies the host computer of the payment completion through World Wide Web.

According to the eighth aspect of the present invention, the message manager transmits the payment completion to the connection manager. The connection manager makes the World Wide Web gateway notify the host computer of the payment completion.

According to the ninth aspect of the present invention, the information provider transmits the credit card number and the expiration date of the terminal user to the payment system.

According to the tenth aspect of the present invention, a system executes payment for goods ordered through World Wide Web by a user of a terminal. The system has a user database for storing the credit card number and the expiration date owned by the user in advance, an interface for connecting to a private network (closed network) which executes payment by credit card.

The system connects to the terminal using a private network, and receives information indicative of a paying request, the amount of payment and the store dealing in the goods from the terminal through the private network. The system also receives the credit card number and the expiration date from the user database and transmits the information indicative of the amount of payment and the store dealing in the goods, together with the credit card number and the expiration date. The system receives information indicative of that the credit card has been verified.

According to the eleventh aspect of the present invention, a system executes payment for goods ordered by a user of a terminal through a network. The system has a user database for storing the credit card number and the expiration date owned by the user in advance. The system also has an interface for connecting to a private network (closed network) which executes payment by credit card. The system connects to the terminal using a private network, and receives from the terminal, through the private network, an order for the goods to the store which is dealing in the goods. The system also transmits a bill for the order to the terminal through the private network and receives a confirmation about the bill from the terminal through the private network. The system reads out the credit card number and the expiration date from the user database, and receives information indicative of that the credit card has been verified from the private network.

According to the twelfth aspect of the present invention, the system further has a store database for storing a goods store name, in association with the connection address of the host computer of the store. The system reads out the connection address of the host computer, which is identified by the store name, from the store database, and connects to the host computer using the connection address through the private line. The system notifies the host computer of the information indicative of that the credit card has been verified through the private line.

According to the thirteenth aspect of the present invention, the recording medium stores a program, which works on a CPU of a terminal connected to a public network. The program includes a browser module for causing CPU to communicate with World Wide Web, and a message viewer module for causing CPU to communicate with a private network. The browser module causes CPU to give an order for goods to a host computer connected to World Wide Web, causes CPU to receive a bill for the goods from World Wide Web, and causes CPU to transmit the bill to the message viewer. The message viewer module causes CPU to execute payment for the goods using the private network.

According to the fourteenth aspect of the present invention, the message viewer module further causes CPU to receive information indicative of payment completion from the private network, and causes CPU to transmit the payment completion to the browser module. The browser module further causes CPU to notify the host computer of the payment completion through World Wide Web.

According to the fifteenth aspect of the present invention, the program comprises a browser module for causing CPU to communicate with World Wide Web, and a message viewer module for causing CPU to communicate with a private network. The message viewer module causes CPU to give an order for goods to the private network, and causes CPU to receive a bill for the goods from the private network. The message viewer also causes CPU to execute payment for the goods through the private network and causes CPU to indicate that the order and the payment have been completed to the browser. The browser module causes CPU to notify World Wide Web of the completion of the order and the payment.

According to the sixteenth aspect of the present invention, the message viewer module causes CPU to transmit the credit card number and the expiration date of the terminal user to the private network during the payment process.

BRIEF DESCRIPTION OF DRAWINGS

FIG. 7 illustrates an example of the structure of the store database 33.

FIG. 8 illustrates an example of the structure of the message user database 34.

FIG. 9 illustrates an example of the structure of the transmittal condition database 36.

FIG. 22 is a diagram showing the goods ordering sequence of the eighth embodiment.

PREFERRED EMBODIMENTS OF THE INVENTION

The preferred embodiments of the present invention will be described with reference to the drawings.

Embodiment 1

Figure 1:
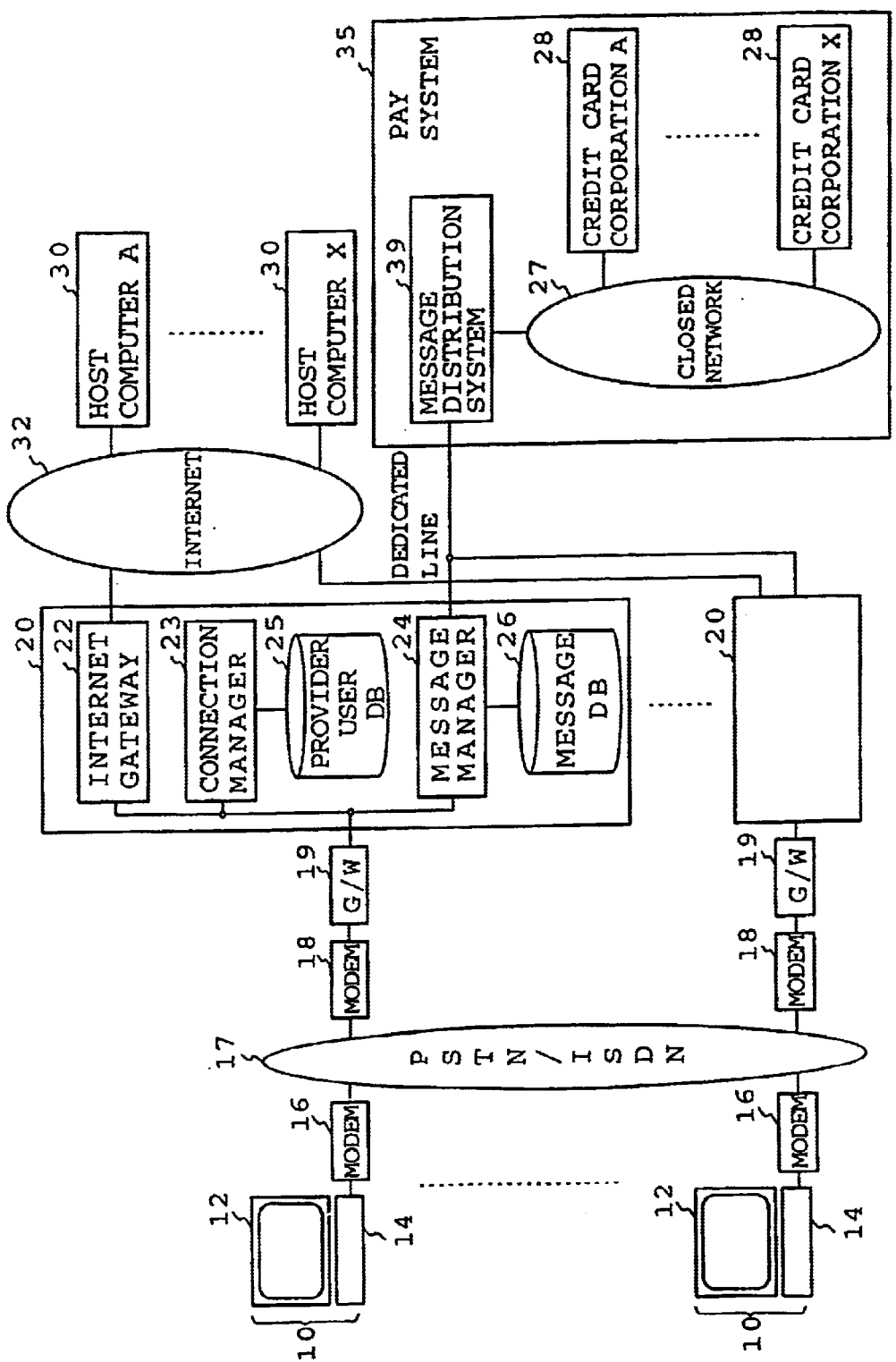
FIG. 1 is a block diagram showing the hardware structure of the overall communication system of the first embodiment of the invention.

FIG. 1 shows the overall structure of the communication system of the first embodiment. One or more terminals 10 are connected to each information provider 20 through the modems 16 and 18, the public network 17 and the public network gateway 19. The information provider 20 is administered by a so-called World Wide Web provider, and is connected to a plurality of host computers 30 through the Internet (World Wide Web) 32. The information provider 20 is also connected to the payment system 35 through a private line.

In the payment system 35, the message distribution system 39 is connected to the computer of a credit card company through the closed network (private network) 27, such as CAFIS™ (preliminary communications network: a network for connecting the host computer of a credit card company with the user terminal of the host computer). The message distribution system 39 is also connected to a plurality of information providers 20 through a private line.

The message distribution system 39 transmits information (i.e., message) regarding goods, such as advertisement, which is offered by a store selling goods on the network, to the terminal 10 through the information provider 20. Message includes still image, dynamic image, voice sound, and combinations thereof. Each message contains data, which represents the home page address of the store on World Wide Web (WWW). The message manager 24 of the information provider 20 stores the message received from the message distribution system 39 in the message database 26 in association with the ID number of the message (message URL).

The host computer 30 stores a home page of each store (and its lower page). The terminal 10 can receive information, such as a home page, from World Wide Web 32 through a World Wide Web gateway 22 of the information provider 20. The user can order goods by accessing the home page and the lower page of the store dealing in the goods. The terminal 10 can also receive the message from the message manager 24. The message manager 24 reads a message from the message database 26 based on a request from the terminal 10, and transmits the message to the terminal 10. Each user has an ID and a password for connecting to the World Wide Web gateway 22 through the public network gateway 19 (i.e., provider user ID and password), as well as an ID and a password for obtaining a message from the message manager 24 (i.e., message user ID and password).

Figure 2:
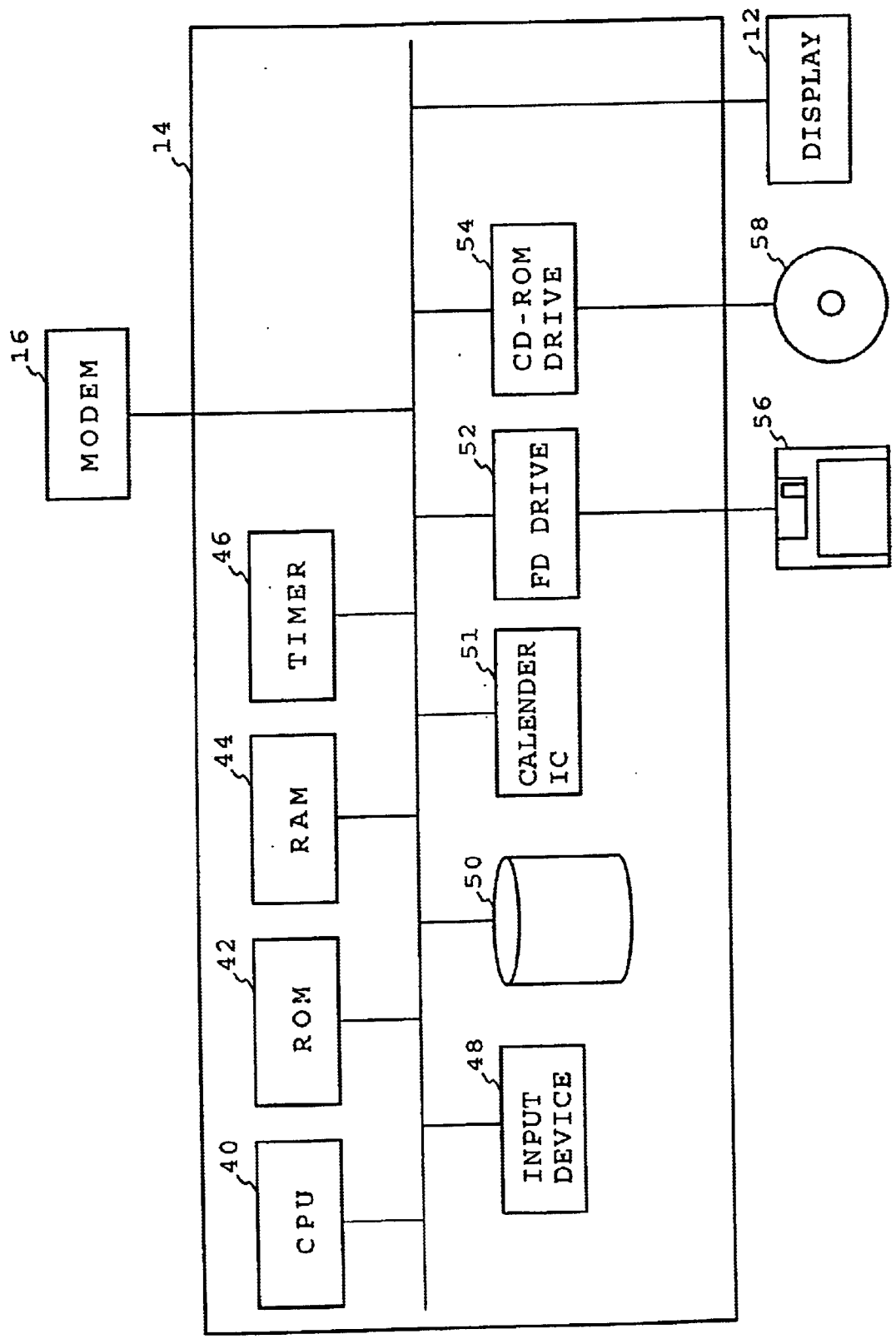
FIG. 2 is a block diagram showing the hardware structure of the terminal 10.

FIG. 2 shows the hardware structure of the main body 14 of the terminal 10. The CPU 40 operates based on the programs stored in the ROM 42 and the RAM 44. The timer 46 counts a predetermined period. The user inputs data through the input device 48. The hard disk drive 50, which is an example of the storage, stores data (e.g., image data), user information, and programs to be operated by CPU 40.

The calendar IC 51 is backed up by the battery, and provides the current time and date to CPU 40. The floppy disk drive 52 reads data or program from the floppy disk 56 and provides them to CPU 40, while the CD-ROM drive 54 reads data or program from the CD-ROM 58 and provides them to CPU 40. The main body 14 has an interface for connecting to the modem 16 and the display 12.

Figure 3:
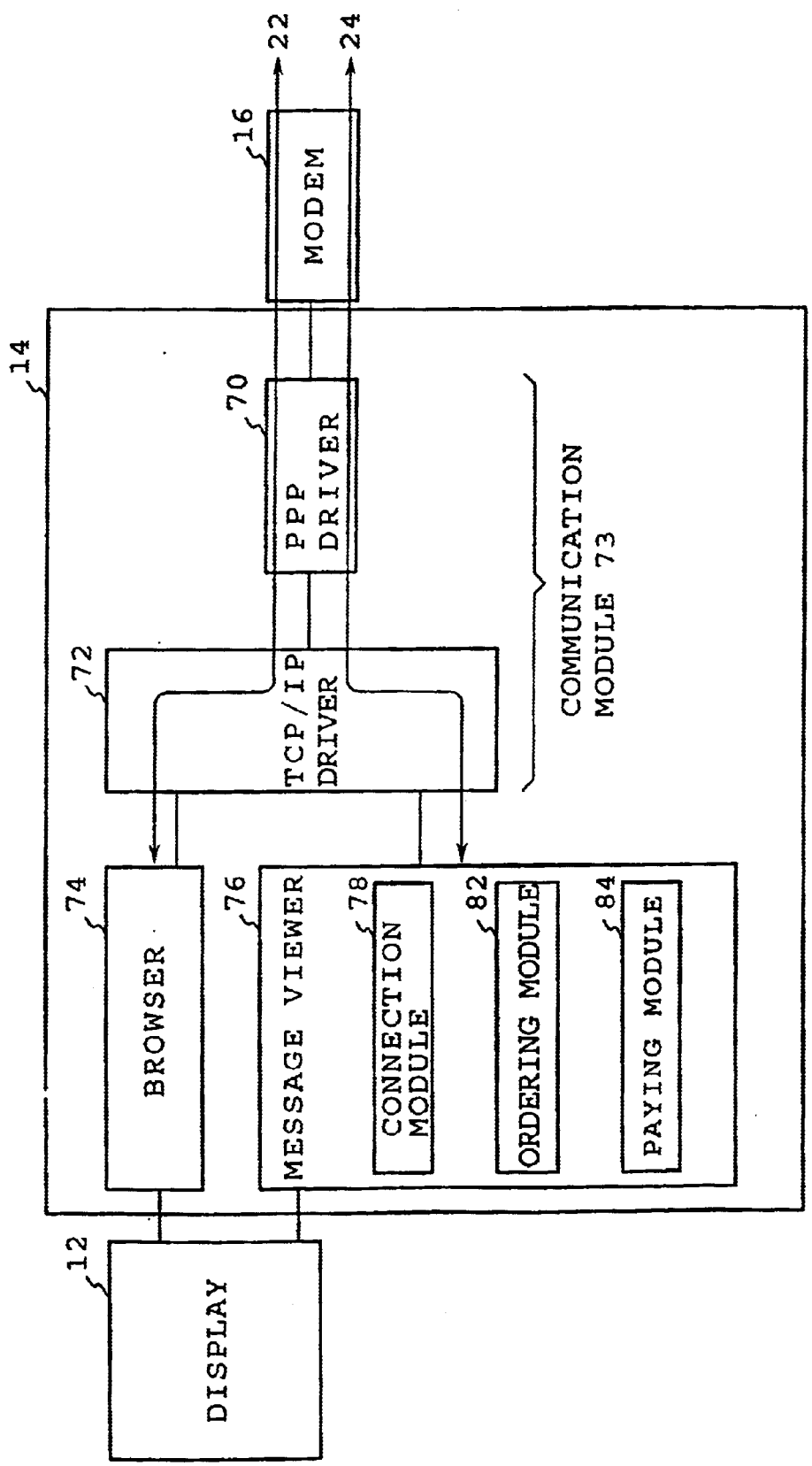
FIG. 3 is a block diagram showing the functional structure of the software executed by CPU 40 of the main body 14.

FIG. 3 shows the functional structure of the software which is executed by CPU 40. The software is provided to the user in the form of data stored in the recording medium such as a floppy disk 56 or CD-ROM 58. The software stored in the recording medium may be compressed or may not be compressed. The software is installed in the hard disk drive 50 from the recording medium, and is read out by the RAM 44 to be executed by CPU 40.

The software stored in the recording medium and provided to the user (that is, the software to be installed in the hard disk drive 50) contains the communication module 73 composed of the PPP driver 70 and the TCP/IP driver 72, the browser 74, and the message viewer 76, as functional elements. The PPP driver 70 creates a data link on a physical line between the public network gateway 19 (FIG. 1). The browser 74 communicates with the gateway 22 through the TCP/IP driver 72 on the data link created by the PPP driver 70. The browser 74 receives the image and displays the image on the display 12. Suitable examples of the browser 74 include Netscape™ and Mosaic™.

The message viewer 76 communicates with the message manager 24 through the TCP/IP driver 72 on the data link created by the PPP driver 70. The message viewer 76 receives the image and displays the image on the display 12. The message viewer 76 contains the connection module 78 used for connecting to the message manager 24, the ordering module 82 used for ordering goods from a store, and the paying module 84 used for paying for the ordered goods.

Figure 4:
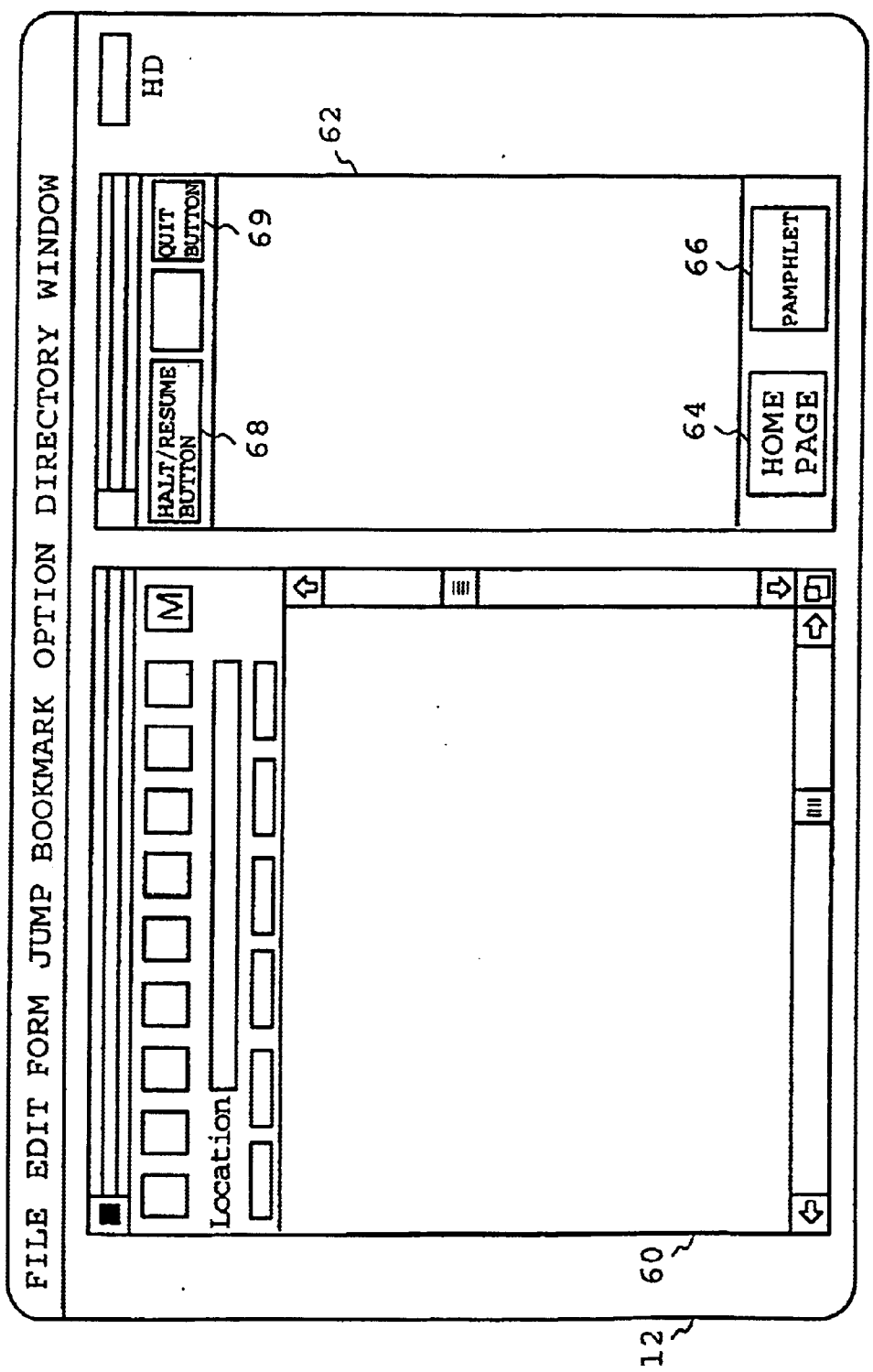
FIG. 4 illustrates an example of the display screen of the display 12.

FIG. 4 is an example of the screen displayed on the display 12. The window 60 of the browser 74 (browser window) and the window 62 of the message viewer 76 (message viewer window) open on the display 12. The browser window 60 displays the information received from World Wide Web 32, and the message viewer window 62 displays the information received from the message manager 24. The message viewer window 62 displays new information every predetermined period, for example, every one minute.

The message viewer window 62 has the home page button 64, the information request button 66, halt/resume button 68, and the quit button 69. When the home page button 64 is selected, the home page which corresponds to the message displayed on the message viewer window 62 is displayed on the browser window 60. When the information request button 66 is selected, goods information regarding the message on the message viewer window 62 is transmitted from the message manager 24 and displayed on the message viewer window 62. Each Message or information includes an order button so that user can order the displayed goods.

Figure 5:
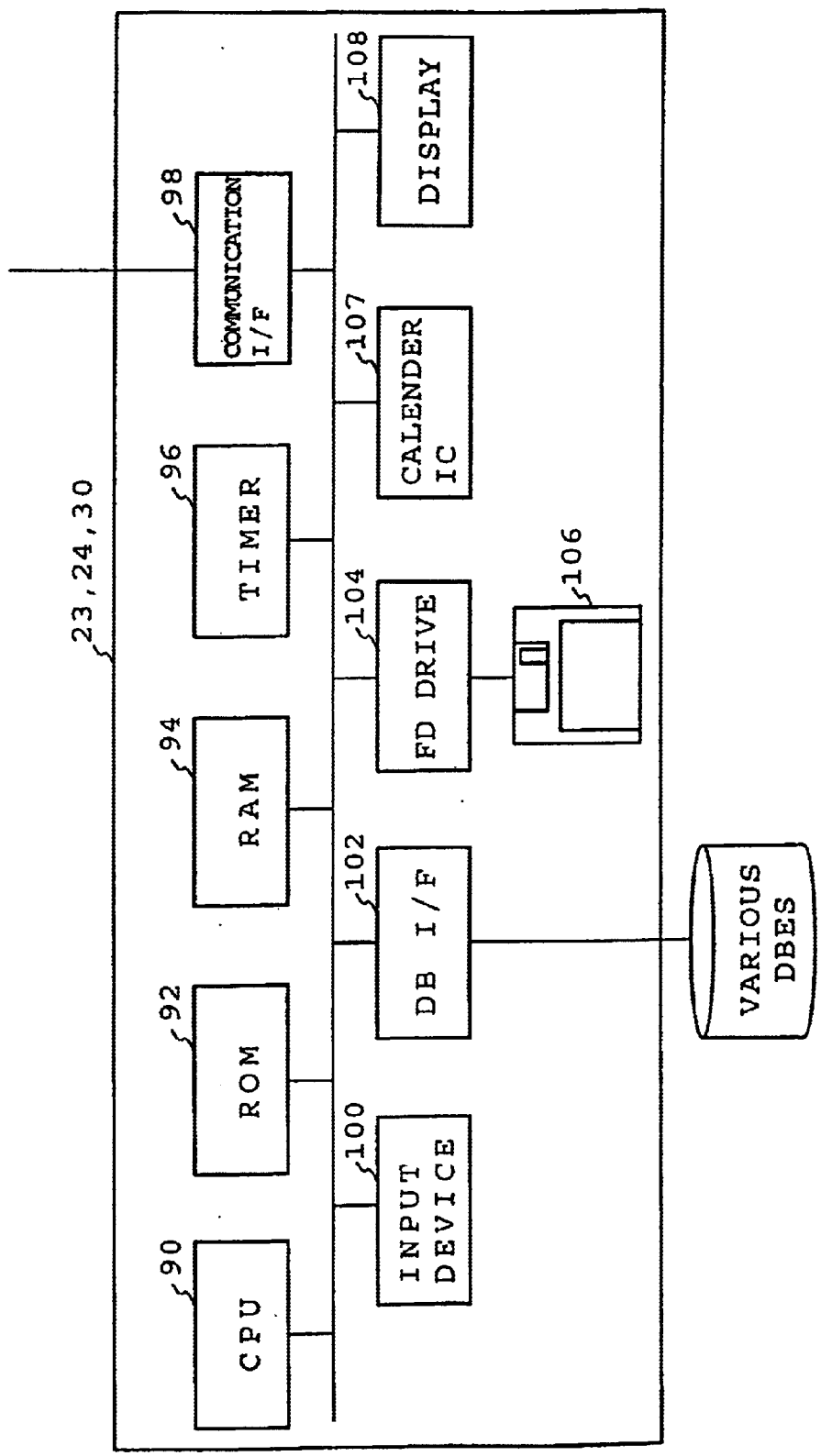
FIG. 5 is a block diagram showing the hardware structure of the connection manager 23, message manager 24 and host computer 30.

FIG. 5 shows the hardware structure of the connection manager 23, the message manager 24 and the host computer 30. The CPU 90 operates based on the programs stored in the ROM 92 and the RAM 94. The timer 96 counts predetermined periods. The communication interface 98 processes inputs and outputs to and from the public line. Data is input by the user through the input device 100. The database interface 102 can be connected to various databases composed of, for example, hard disk. The floppy disk drive 104 reads the data or program from the floppy disk 56 and transmits it to CPU 90. The calendar IC sends the date and time to CPU 90. The display 108 displays communication state to the operator.

Figure 6:
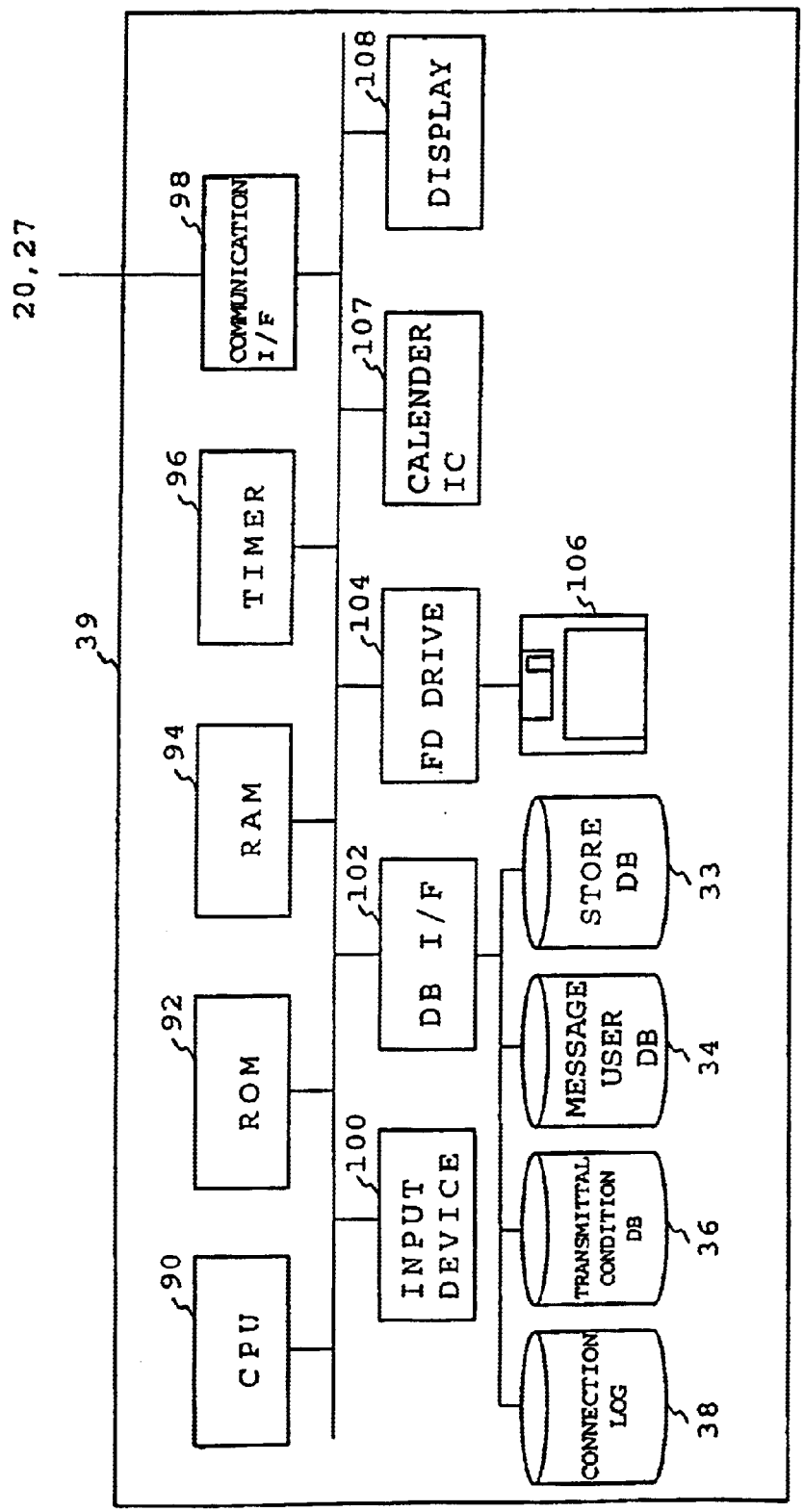
FIG. 6 is a block diagram showing the hardware structure of the message distribution system 39.

FIG. 6 shows the structure of the message distribution system 39. The same numbers are assigned to the same elements as those in FIG. 5, and the explanation will be omitted. Instead of the communication interface 98, a communication interface for connecting to the private network 27 and a communication interface for connecting to the information provider 20 may be separately provided. The message distribution system 39 includes store database 33, message user database 34 for storing information about the message user of each terminal 10, the transmittal condition database 36 for storing the transmission condition for each message, and the connection log 38 for storing the communication history.

FIG. 7 shows the structure of the store database 33. The store database 33 stores the store code of each store which sells goods on the network, the store code being registered by the credit card corporation 28; and the network connection address representative of the host computer 30 of each store.

FIG. 8 shows the structure of the message user database 34. The message user database 34 contains message user ID and message user password for each message, provider ID for identifying each information provider 20, provider user ID for accessing World Wide Web through the provider, message display time, and user information including user's birth date, gender, single or married, occupation, address, etc. The message user database 34 also contains user's credit card number, expiration date, name, and the last communication date.

The user inputs user information to the terminal 10 when he uses the message viewer 76 first time, or when he installs the message viewer 76 in the terminal 10. The terminal 10 stores the user information in the hard disk drive 50, while transmitting the user information to the message manager 24. The message manager 24 transfers the user information to the message distribution system 39, which then stores the user information in the message user database 34. User information may further include user's age, occupation category, income, hobby, etc.

FIG. 9 shows the structure of the transmittal condition database 36. The transmittal condition database 36 stores the message URL for identifying each message, together with the message transmission condition, to associate each message with the corresponding transmission condition. The message transmission condition includes limitation of display frequency to each user, limitation of display frequency to the entire users, message display time, range of age of users suitable to the message, gender, single or married, occupation, address, etc. New search item can be added to the transmittal condition database 36, as necessary. The message distribution system 39 reads the user information from the message user database 34 in response to the request from the terminal 10, and searches the message from the transmittal condition database 36 based on the user information. The message distribution system 39 transmits the URL of the searched message to the terminal 10. Thus, the message URL of appropriate message which suits the user (e.g., advertisement of the goods suitable to the user) can be sent to each terminal 10.

Figure 10:
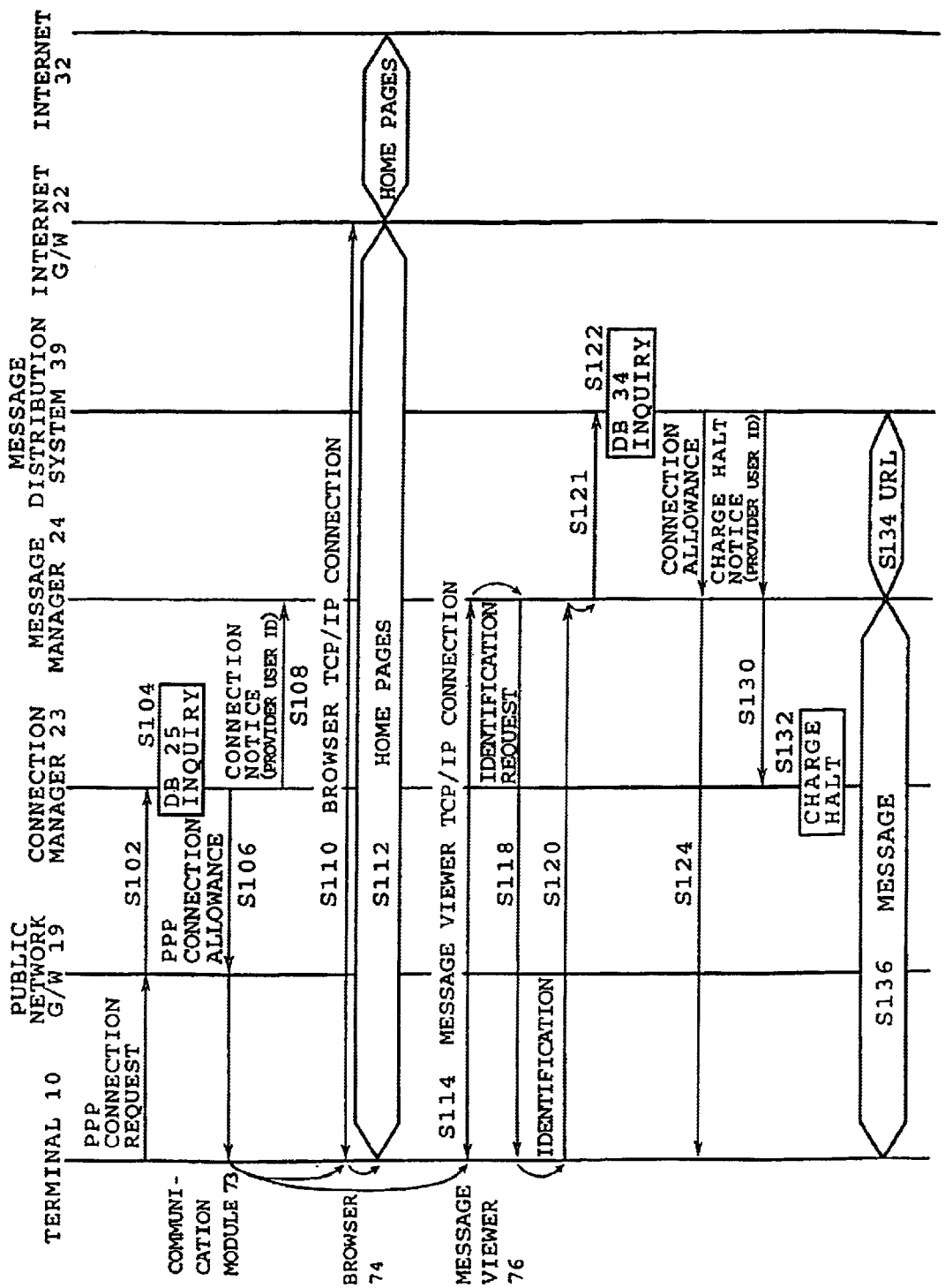
FIG. 10 is a diagram showing the connection sequence of the terminal 10 to World Wide Web 32 and to the message distribution system 39.

The connection sequences of the terminal 10, the connection manager 23, the message manager 24, the message distribution system 39, the gateway 22 and the Internet 32 will be described with reference to FIG. 10. When the communication module 73 of the terminal 10 requests PPP connection (S102), the connection manager 23 verifies if the provider user ID and the provider user password are registered in the provider user database 25 (S104).

If the ID and the password are registered, the connection manager 23 transmits a PPP connection permission to the terminal 10 (S106). At the same time, the connection manager 23 notifies the message manager 24 of the provider user ID (S108). When the PPP connection is allowed, the browser 74 of the terminal 10 TCP/IP connects to the gateway 22 (S110), and communicates with World Wide Web 32 through the World Wide Web gateway 22 (S112). Meanwhile, the connection module 78 of the message viewer 76 TCP/IP connects to the message manager 24 (S114). Then, the message manager 24 sends a verification request to the message viewer 76 of the terminal 10 (S118).

Upon receiving the verification request, the connection module of the message viewer 76 transmits the message user ID and the password as verification to the message manager 24 (S120). The message manager 24 transmits to the message distribution system 39 the provider user ID received from the connection manager, the message user ID received from the message viewer 76, and the provider ID of the information provider 20 (S121). Then, the message distribution system 39 determines if the received message user ID and the message user password are registered in the message user database 34 (S122). If these are registered, the message distribution system 39 transmits a connection permission to the message viewer 76 (S124).

Next, the message distribution system 39 sends a notification to the connection manager 23 to stop charging on the user who is identified by the provider user ID (S130). In response to the notification, the connection manager 23 stops charging on the user for his usage of the information provider 20 (S132). During stopping the charge, the connection fee is paid to the information provider 20 by the message distribution system 39. On the other hand, the message distribution system 39 bills the message provider, such as a store, for displaying the message. This structure allows the user to access World Wide Web 32 free of charge on the condition that the advertisement of the store is displayed on the message viewer window 62.

Since separate links are set between the browser 74 and world Wide Web 32, and between the message viewer 76 and the message manager 24, respectively, these two can independently communicate. The communication technique between the browser 74 and World Wide Web 32 is known, and the explanation will be omitted here. The message viewer 76 periodically sends a request for message URL to the message distribution system 39 using the timer 46 (S134). When receiving the message URL searched by the message distribution system 39, the message viewer 76 requests the message manager 24 of the message of the message URL (S136).

The message manager 24 searches the message, which corresponding to the received message URL, from the message database 26, and transmits it to the message viewer 76 (S136). The transmitted message includes, for example, advertisement of goods. The user can order any goods among the advertised goods. The communication between World Wide Web 32 and the browser 74 is less expensive. However, the reliability is low because data is transferred through a number of computers in World Wide Web. On the contrary, communications between the message viewer 76 and the message manager 24, and between the message viewer 76 and the message distribution system 39 are conducted through exclusive networks, and the reliability is high.

Figure 11:
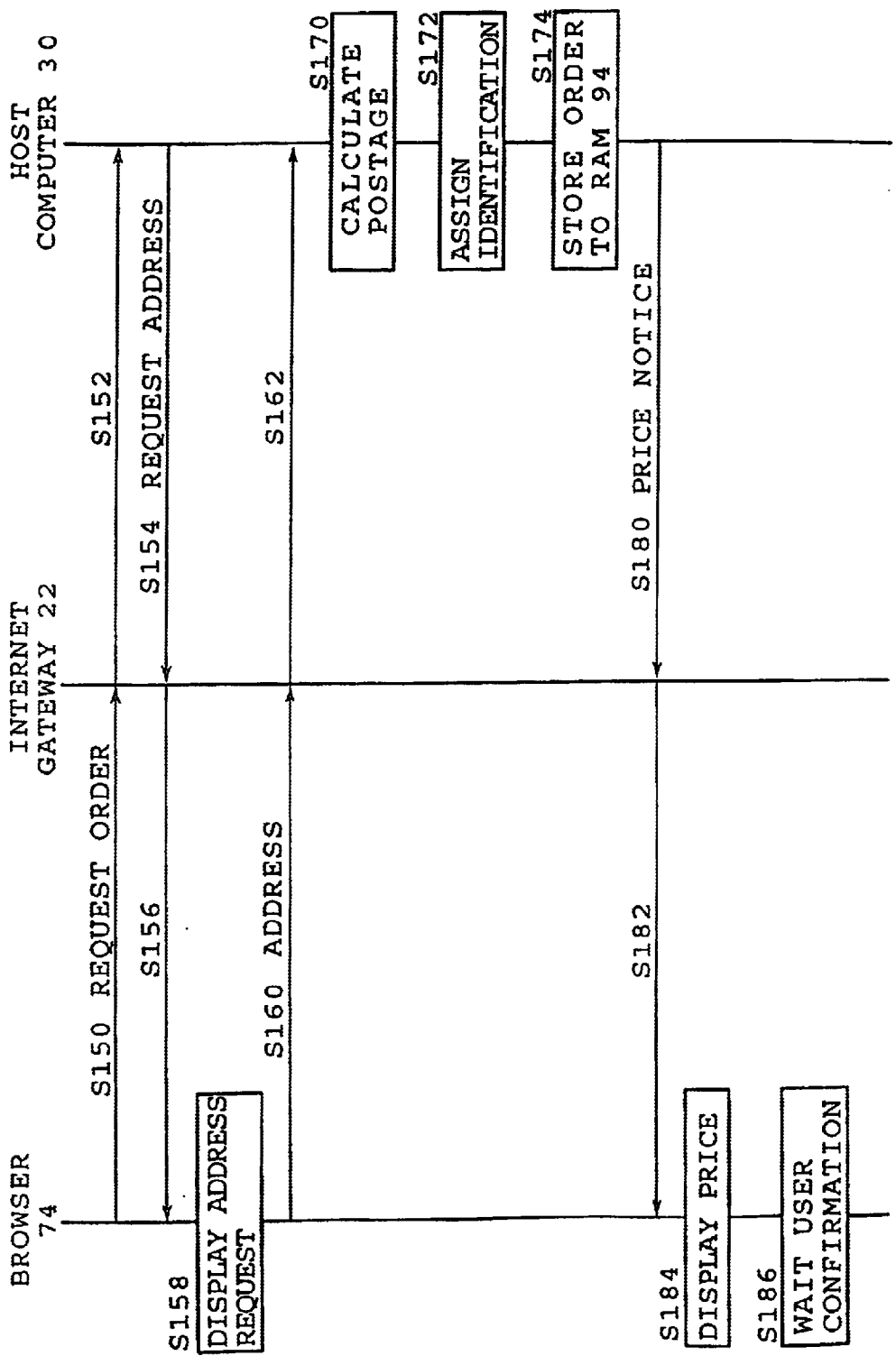
FIG. 11 is a diagram showing the goods ordering sequence of the first embodiment.

FIG. 11 shows goods order sequence using the system shown in FIG. 1. In the preferred embodiment, the user designates goods that the user wishes to order through the browser 74. The ordering page for the goods is displayed on the browser window 60 by selecting the home page button 64 in the message viewer window 62. Alternatively, the ordering page may be displayed on the browser window 60 by operating on the browser window 60.

The browser 74 transmits the order request, which indicates the goods designated by the user, to the World Wide Web gateway 22 (S150). The World Wide Web gateway 22 transmits the order request to the host computer 30 through World Wide Web 32 (S152). The host computer 30 sends a request for the mailing address and the name of the user to The World Wide Web gateway 22 (S154), which is then forwarded to the browser 74. Upon receiving the address and name request from The World Wide Web gateway 22 (S156), the browser 74 displays a request on the browser window 60 to request the user to input the mailing address and name (S158).

The browser 74 transmits the mailing address and name input by the user to the gateway 22 (S160), which is then transmitted to the host computer 30 (S162). The host computer 30 determined if the goods can be delivered by mail, and if yes, the postage fee is determined (S170). If the goods are delivered by mail, the order ID number is assigned to the order (S172). The order ID number, goods name, mailing address and name are stored in the RAM 94 (S174).

The host computer 30 transmits the order ID number, goods name, mailing address and name, the price of the goods, tax, postage fee, total amount, time taken for delivery, and the store code indicative of the store dealing in the goods, to the gateway 22 (S180), which are then transmitted to the browser 74 (S182). The browser 74 displays this information on the browser window 60 (S184), and waits a confirmation from the user (S186). If the goods are sent only to the user through the communications network, steps S154 through S170 may be omitted. When the user inputs the confirmation, the paying sequence starts.

Figure 12:
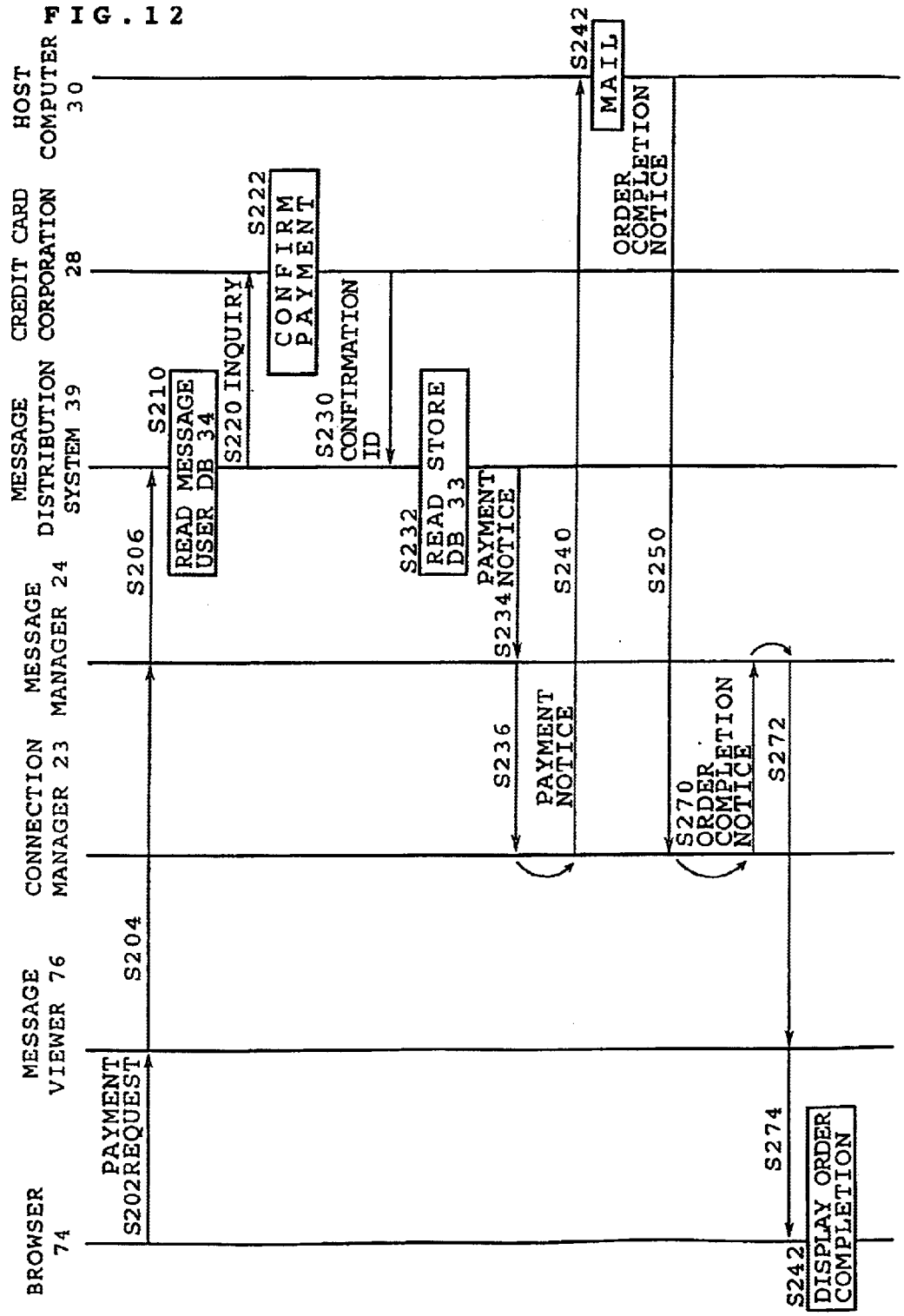
FIG. 12 is a diagram showing the payment sequence of the first embodiment.

FIG. 12 shows the paying sequence. The action of the message viewer 76 is executed by the paying module 84. The browser 74 transfers the payment request, which indicates the order ID number, total amount and the store code, to the message viewer 76 (S202). The message viewer 76 transmits the payment request to the message manager 24 (S204), which is then forwarded to the message distribution system 39 through the private line (S206). The message distribution system 39 reads out the credit card number, the expiration date and the name of the message user from the message user database 34 (S210).

The message distribution system 39 transmits the total amount, store code, credit card number, expiration date and name to the credit card corporation 28 through the private network 27 to confirm if the credit card is valid (S220). The credit card corporation 28 verifies the credit card. If the credit card is valid, the credit card corporation 28 processes the payment (S222), and transmits the payment acknowledge ID to the message distribution system 39 (S230). The message distribution system 39 reads out the connection address of the store from the store database 33 based on the store code (S232). The message distribution system 39 also transmits a payment notice to the message manager 24, which shows the order ID number, payment acknowledge ID and the connection address (S234). The message manager 24 transmit the received information to the connection manager 23 (S236).

The connection manager 23 transmits the payment notification, which indicates the order ID and payment acknowledge ID, to the host computer 30 represented by the connection address (S240). Then, the host computer 30 reads out the goods name, mailing address and name from the RAM 94 based on the ID number to mail the goods (S242). The host computer 30 also notifies the connection manager 23 of the completion of the order of the goods (S250).

The connection manager 23 notifies the message manager 24 of the completion of the order (S270), which is then transmitted from the message manager 24 to the message viewer 76 (S272). The completion of the order is further transmitted from the message viewer 76 to the browser 74 (S274). The browser 74 displays the information on the browser window 60 (S276).

Even when purchasing goods displayed on World Wide Web page, the user can pay through the message distribution system 39. Since the credit card number and the expiration date are not transmitted through World Wide Web 32, improper use of the credit card number by a third party can be prevented. The reliability of the private line is much higher than that of World Wide Web 32, which can prevent the acknowledge ID, payment notice, or order completion notice from being lost.

Embodiment 2

Figure 13:
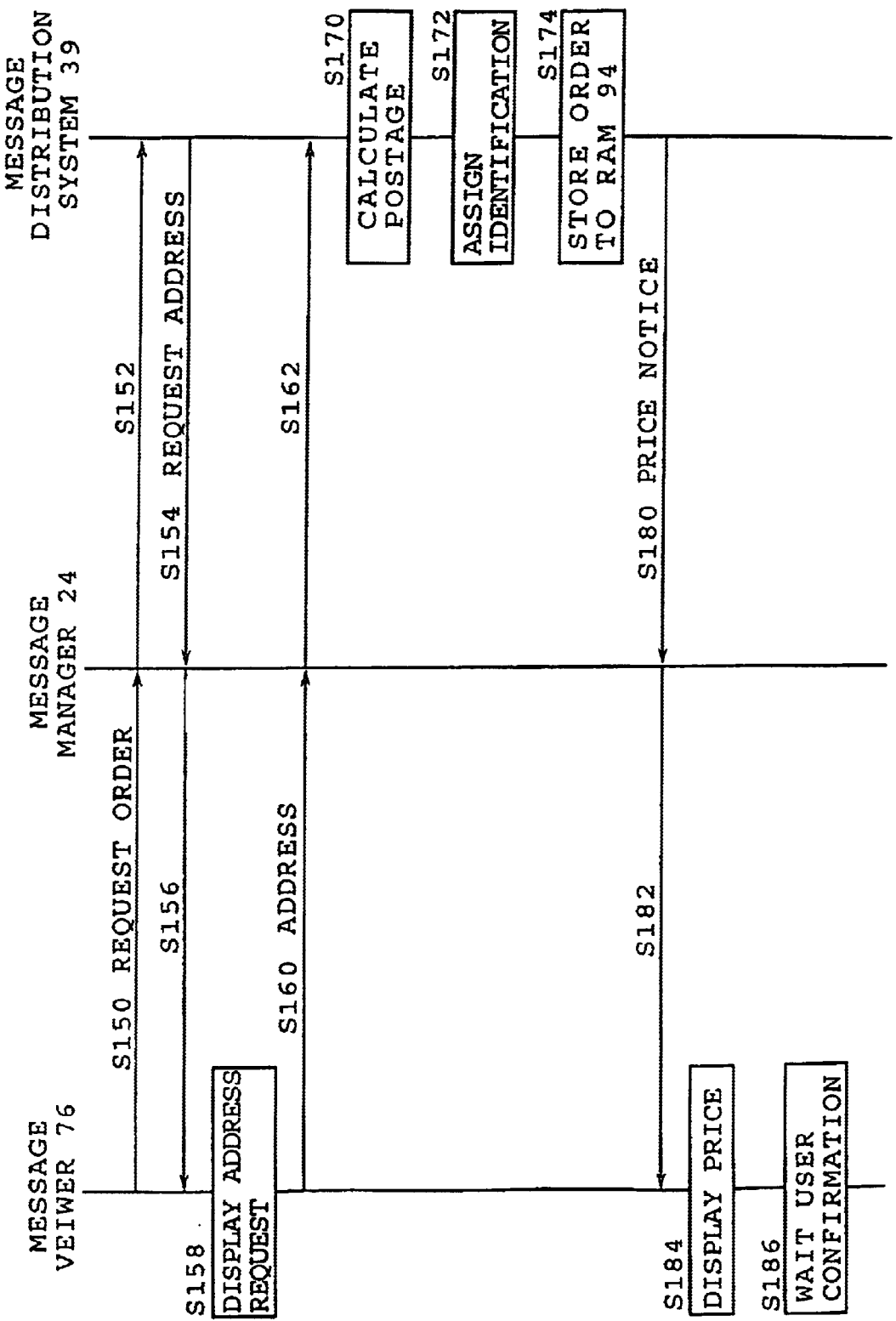
FIG. 13 is a diagram showing the goods ordering sequence of the second embodiment.

FIG. 13 shows the goods ordering sequence using the message viewer 76. In this embodiment, the message distribution system 39 receives an order for goods. The message viewer 76 sends an order request for goods to the message manager 24 (S150), which is then sent from the message manager 24 to the message distribution system 39 (S152). The message distribution system 39 sends a request for the user's address and name to the message manager 24 (S154), which is sent to the message viewer 76 (S156). Upon receiving the request, the message viewer 76 displays the request for the user's address and name on the message viewer window 62 (S158). When the user input the information, the message viewer 76 transmits the information to the message manager 24 (S160), which is further sent to the message distribution system 39 (S162).

The message distribution system 39 calculates the postage for sending the goods (S170), puts the ID number to the order (S172), and stores the ID number, goods name, and the mailing address in the RAM 94 (S174), while transmitting the information through the message manager 24 (S180) to the message viewer 76 (S182). The message viewer 76 displays the received information including the total amount (S184) and waits the user's confirmation (S186). Compared with FIG. 11, the message viewer 76 in place of the browser 74, the message manager 24 in place of The World Wide Web gateway 22, and the message distribution system 39 in place of the host computer 30 perform the ordering actions.

Figure 14:
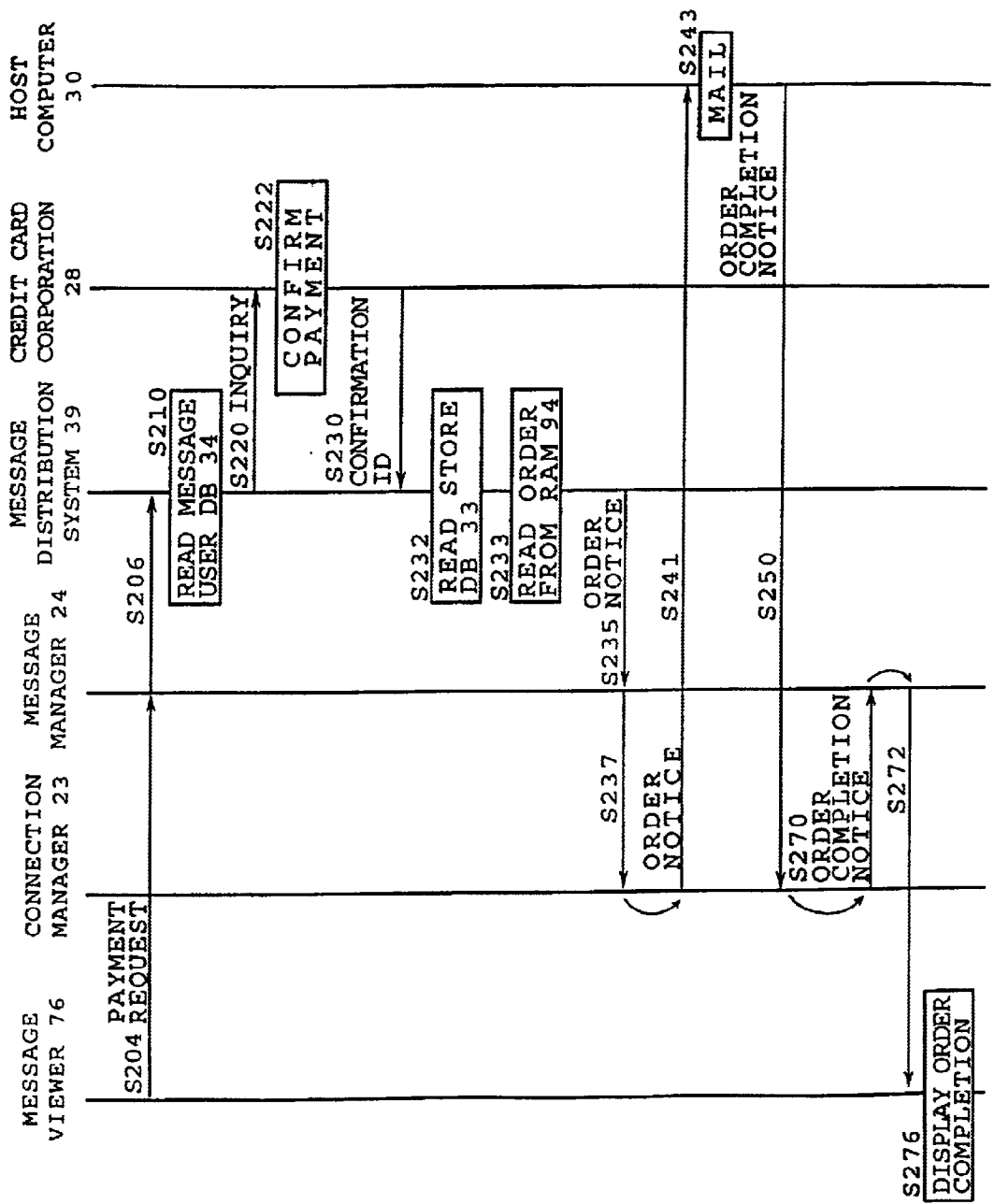
FIG. 14 is a diagram showing the payment sequence of the second embodiment.

FIG. 14 shows the paying sequence of this embodiment. After the message distribution system 39 reads out the connection address of the store from the store database 33 (S232), the goods name and the mailing address, which have been stored at S160, is further read out from the RAM 94 (S233). The message distribution system 39 also transmits the connection address, the goods name, payment acknowledge ID, and the mailing address to the message manager 24 to notify the order (S235). This information is sent from the message manager 24 through the connection manager 23 (S237) to the host computer 30 (S241). The process hereinafter is the same as FIG. 12, and explanation will be omitted.

When the advertisement of goods is displayed on the message viewer window 62, the user can order goods only by watching the message viewer. For example, if the material, which is sent to the user after selecting the information request button 66, contains advertisement of the goods, the user can directly order the goods on the message viewer. Furthermore, a communication system which allows the ordering operation by either method of the first or second embodiment can be constituted.

Embodiment 3

Figure 15:
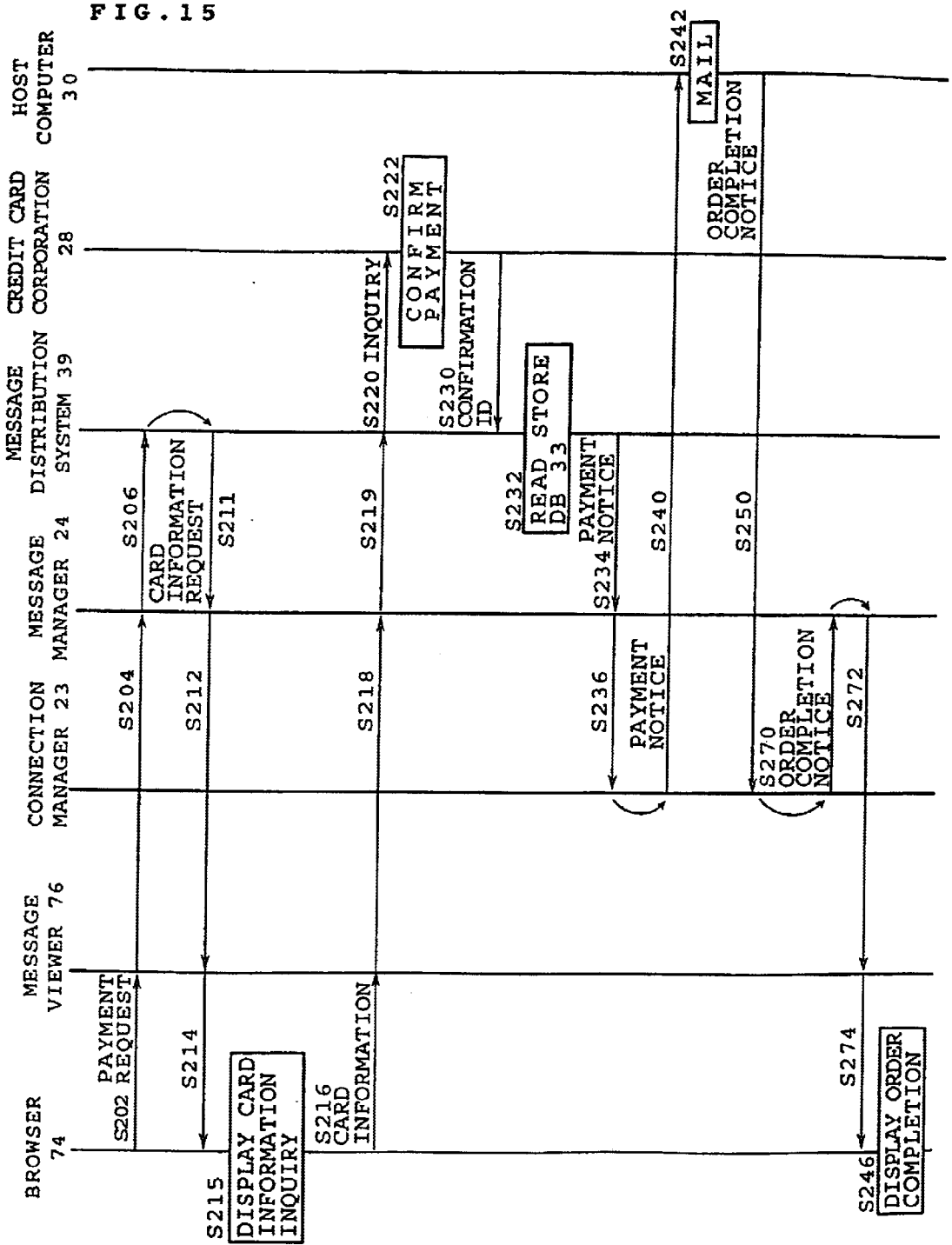
FIG. 15 is a diagram showing the payment sequence of the third embodiment.

FIG. 15 shows the paying sequence of the third embodiment. the structure other than the paying sequence is the same as the embodiment 1. When the message distribution system 39 receives a payment request (S202, S204, S206), the message distribution system 39 transmits a request for the card information to the message viewer 76 (S211, S212). The message viewer 76 sends the card information request to the browser 74 (S214), and the browser 74 displays the request for the credit card number and the expiration date on the display 12 (S215). When the user inputs the credit card number and the expiration date, the browser 74 transmits the card information to the message viewer 76 (S216). The message viewer 76 transmits the card information to the message distribution system 39 (S218, S219). The process hereinafter is the same as FIG. 12.

In this embodiment, every time a payment request occurs, the user is requested to input the card information. It is not necessary to store the user's credit number and the expiration date in the message user database 34. The user can choose a credit card as he likes every time purchasing goods. In the second embodiment, the credit card number and the expiration date may be checked with the message viewer 76 for each payment, similar to the third embodiment.

Embodiment 4

Figure 16:
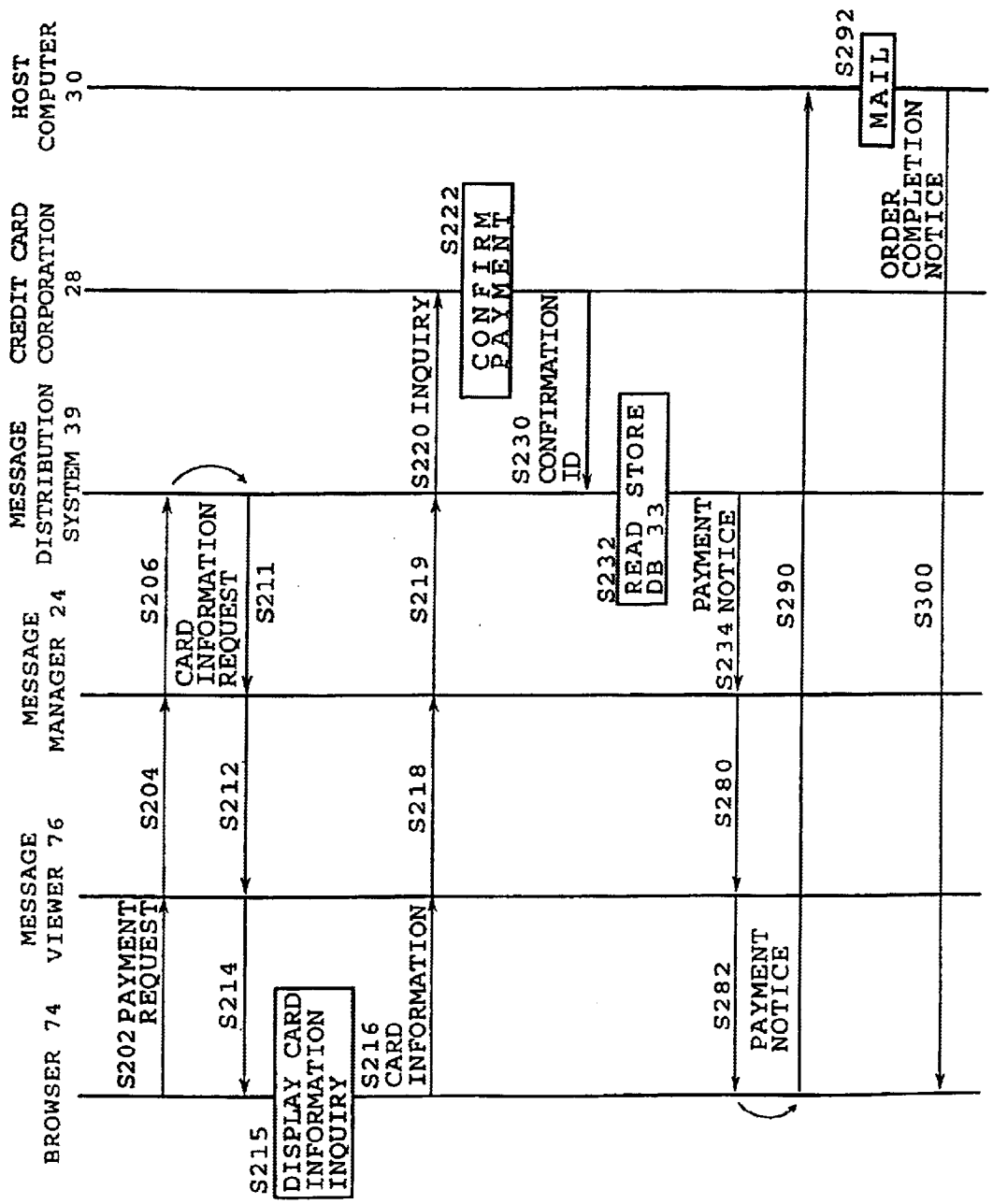
FIG. 16 is a diagram showing the payment sequence of the fourth embodiment.

FIG. 16 shows the paying sequence of the fourth embodiment. The structure other than the paying sequence is the same as that of the third embodiment. Also, in the paying sequence, the actions up to reading out the connection address from the store database 33 (S232) are the same as the third embodiment, the explanation will be omitted. The message distribution system 39 reads out the connection address (S232), and notify the message viewer 76 of the payment acknowledge ID and the connection address (S234, S280).

The message viewer 76 transmits the payment acknowledge ID and the connection address to the browser 74 (S282). The browser 74 transmits a payment notice including the payment acknowledge ID to the host computer 30 indicated by the connection address, which shows the payment completion (S290). The host computer 30 executes the delivery process for sending the goods to the address stored in the RAM 94 at S160 (S292), and transmits an order completion notice to the browser 74 to indicate the completion of the order (S300).

Compared with the first and second embodiments, the sequence of this embodiment is simpler, and ordering and paying for the goods can be easily done. Particularly, the process by the message manager 24 is facilitated and is realized without greatly changing the existing system and equipment of the provider. Meanwhile, in the first and second embodiments, the terminal 10 needs not operate between the payment process by the credit card corporation 28 and the delivery process by the host computer 30, and therefore, even when the power source of the terminal 10 is disconnected, the goods are sent out to the user without failure. This can prevent improper withdrawal from the credit card account without sending the goods to the user.

Embodiment 5

In this embodiment, the order receiving operation described in the fourth embodiment is carried out by the message viewer 76. The ordering sequence is the same as the second embodiment (FIG. 13), and the explanation will be omitted.

Figure 17:
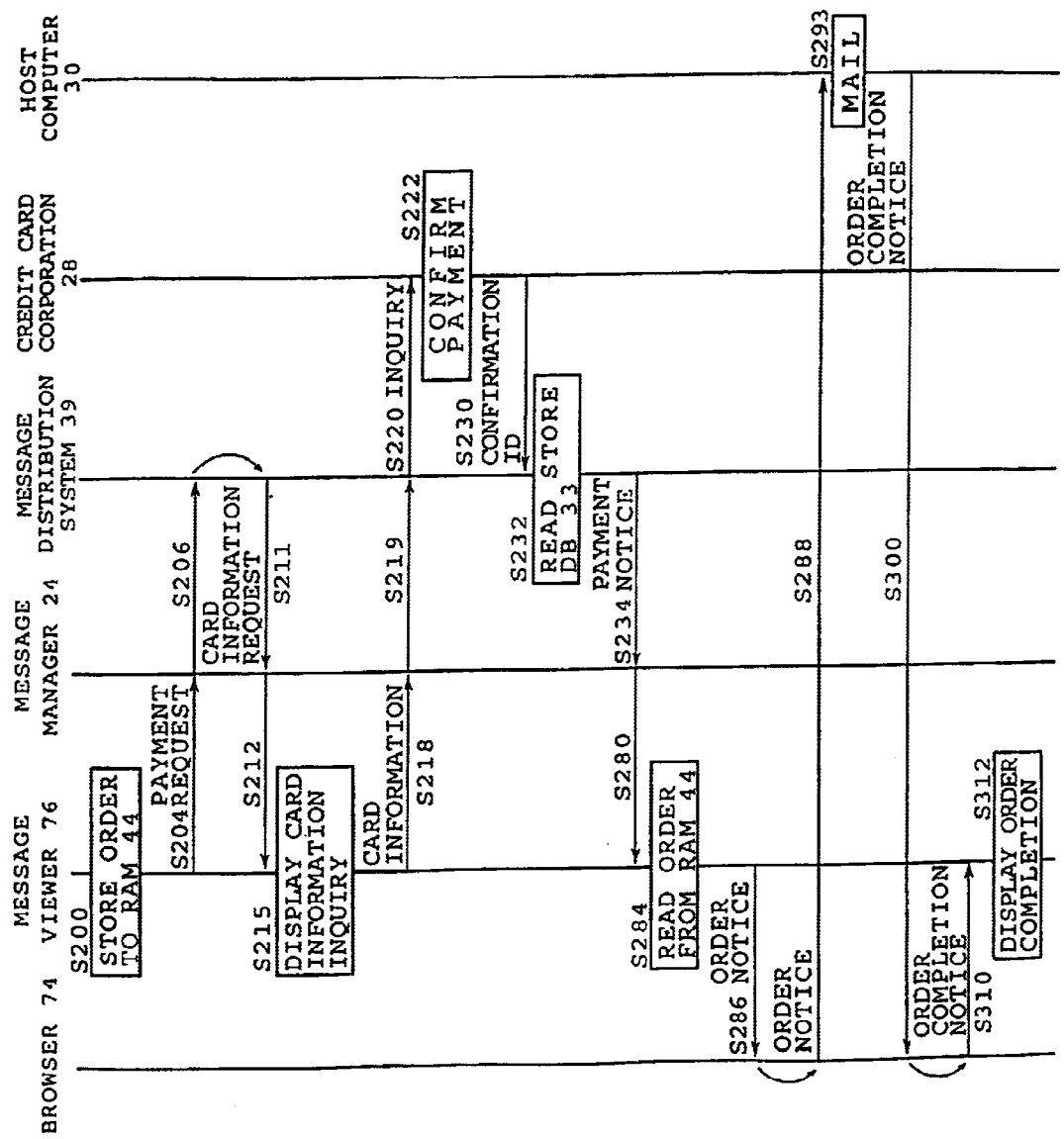
FIG. 17 is a diagram showing the payment sequence of the fifth embodiment.

FIG. 17 shows the paying sequence. The message viewer 76 stores the order notified at S182 (FIG. 13) in the RAM 44 (S200). The process hereinafter is similar to that of the fourth embodiment (FIG. 16), and so, only the different points from the fourth embodiment will be described. The card information is input through the message viewer window 62 (S215). Upon receiving the payment notice (S280), the message viewer 76 reads out the order from the RAM 44 (S284). The message viewer 76 also transmits the goods name, the connection address of the store, the payment acknowledge ID, and the mailing address and name to the browser 74 to notify the browser 74 of occurrence of the order (S286).

The browser 74 connects itself to the host computer 30, which is represented by the connection address, to notify the host computer 30 of the order by transmitting the goods name, the payment acknowledge ID, to the mailing address and name to the host computer 30 (S288). The host computer 30 executes the delivery process (S293), and notifies the browser 74 of the completion of the delivery process (S300), which is then transmitted from the browser 74 to the message viewer 76 (S310). The message viewer 76 displays the completion of the order on the message viewer window 62 (S312).

Compared with the fourth embodiment, the burden on the message manager 24 is reduced. Meanwhile, the fourth embodiment has an advantage that improper payment without delivering the goods is prevented even when the power source of the terminal 10 is disconnected at any time. In this embodiment, when the advertisement of the goods is displayed on the message viewer window 62, the user can make an order for the goods simply by watching the message viewer window 62. For example, when the material sent from the information request button 66 contains the advertisement of the goods, the user can directly order the goods on the message viewer window 62.

Embodiment 6

Figure 18:
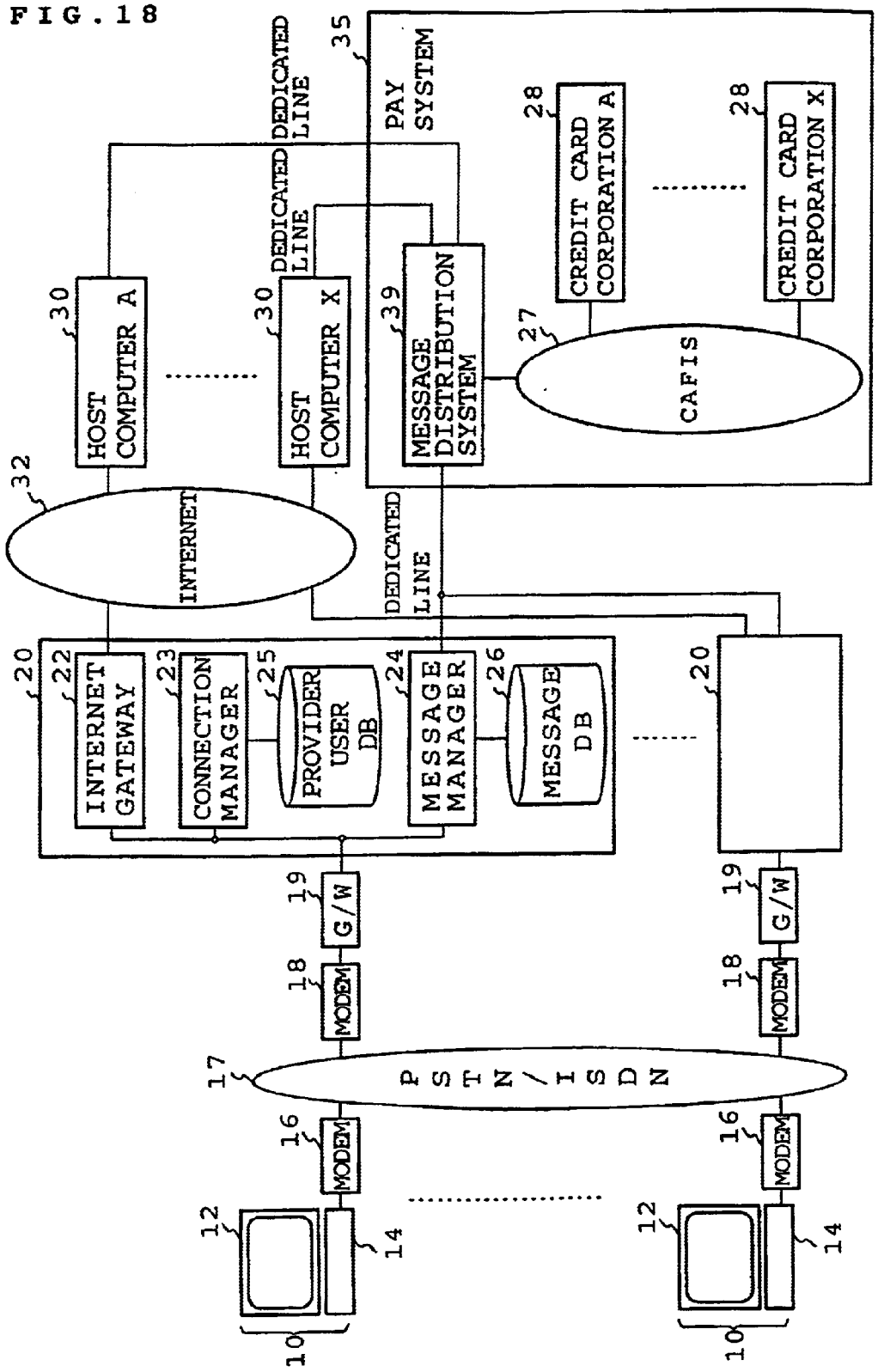
FIG. 18 shows the overall structure of the communication system of the sixth embodiment.

FIG. 18 shows the overall structure of the communication system of the sixth embodiment. The host computer 30 of the store is connected to the message distribution system 39 through the private line. The other portion of the structure is the same as FIG. 1, and the explanation will be omitted. The ordering sequence of this embodiment is the same as that shown in FIG. 11.

Figure 19:
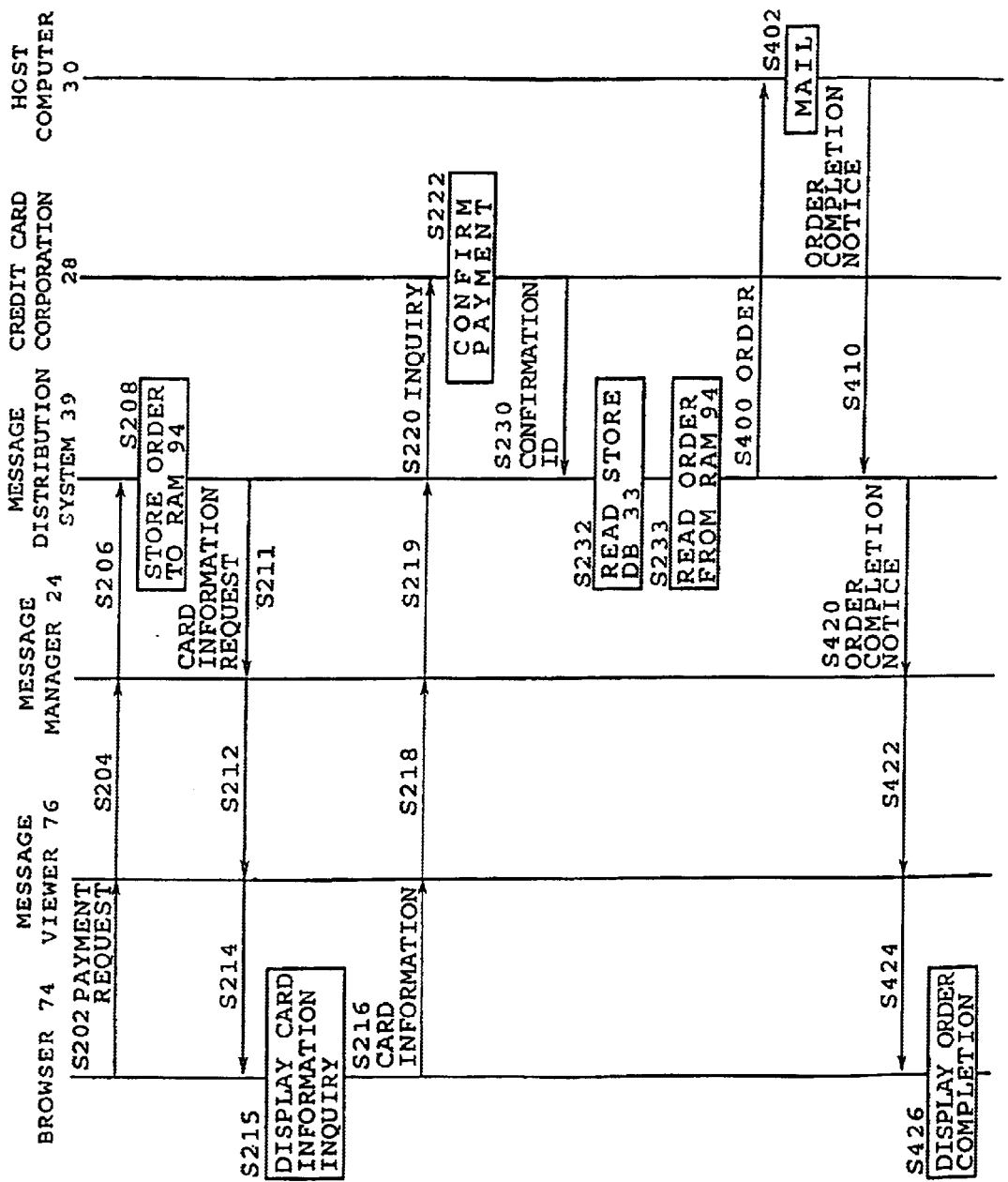
FIG. 19 is a diagram showing the payment sequence of the sixth embodiment.

FIG. 19 shows the paying sequence of this embodiment. When payment is requested, the browser 74 notifies the message viewer 76 of the order including store code, the goods name, the total amount, and the mailing address and name (S202). The order is transmitted through the message manager 24 to the message distribution system 39 (S204, S206), and is stored in the RAM 94 of the message distribution system 39 (S208). The credit card verification steps (S211 to S230) and the reading the store database 33 (S232) are the same as the third embodiment, and the explanation will be omitted.

The message distribution system 39 reads out the order from the RAM 94 (S233), and directly notifies the message distribution system 39 of the occurrence of the order by transmitting the connection address and the order to the host computer 30 (S400). The host computer 30 executes the mailing process to mail the goods to the address which are indicated by the order notice (S402). When the host computer 30 transmits a notice of completing the order process to the message distribution system 39 (S410), the message distribution system 39 transmits the notice to the message manager 24 (S420), which is further transmitted to through the message viewer 76 (S422) to the browser 74 (S424). The browser 74 displays the completion of the order on the browser window 60.

In this embodiment, the order for goods is transmitted from the message distribution system 39 to the host computer 30 without passing through the Internet (World Wide Web) 32. This structure can prevent the order from not being transmitted to the host computer 30 due to the accident on World Wide Web 32. The reliability of the private line is relatively high, and a situation where the goods are not delivered in spite of the payment is avoided.

Embodiment 7

In this embodiment, receipt of the order described in the sixth embodiment is executed by the message distribution system 39. The ordering sequence is the same as the second embodiment (FIG. 13), and the explanation will be omitted. The host computer 30 is not connected to World Wide Web 32.

Figure 20:
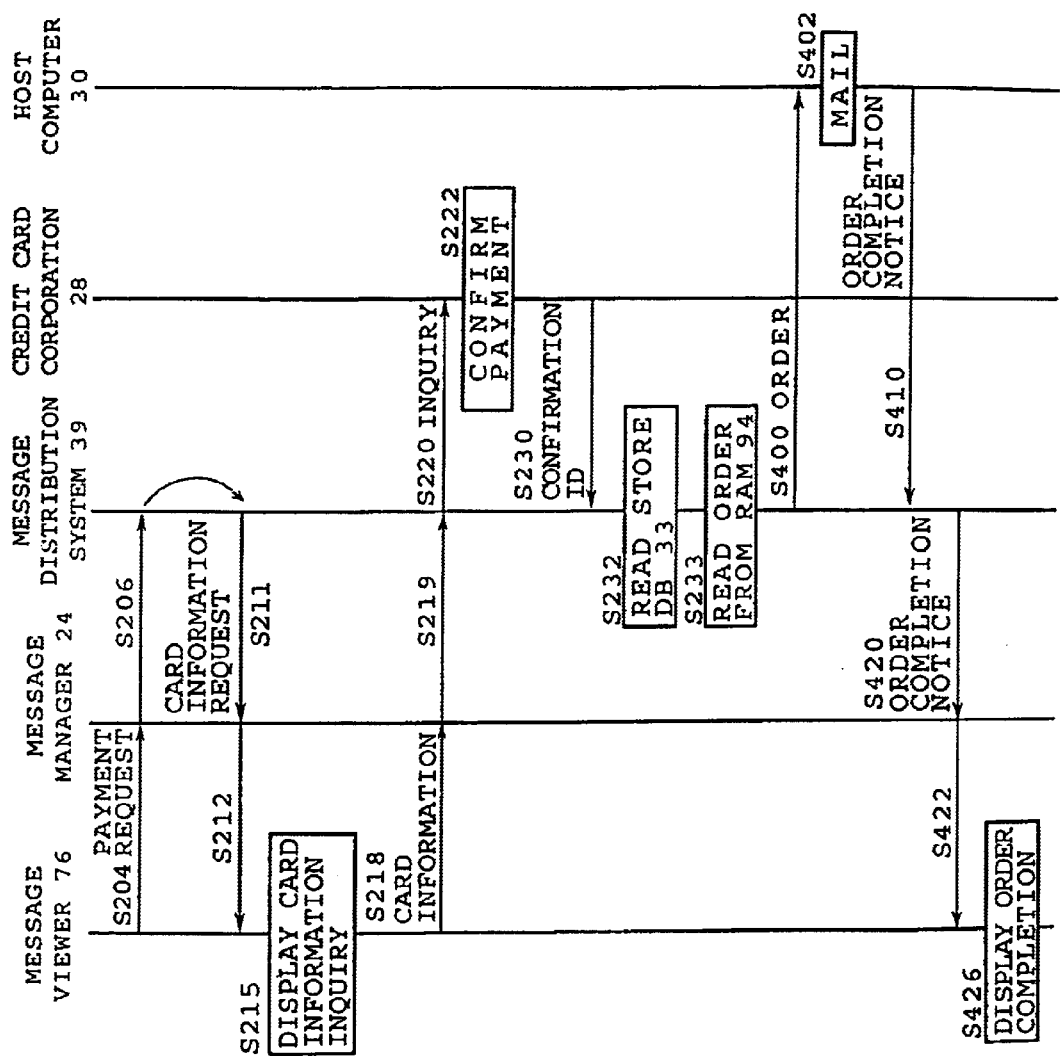
FIG. 20 is a diagram showing the payment sequence of the seventh embodiment.

FIG. 20 shows the paying sequence of this embodiment. Compared with the paying sequence of the sixth embodiment (FIG. 19), the browser 74 does not take part in the payment operation. Also, since, in this embodiment, the order is stored in the RAM 94 at S174 of FIG. 13, the order is not transmitted at the payment request step (S204). Only the payment request is transmitted. At S233, order, which was stored at S174, is read out from the RAM 94. The other actions are the same as FIG. 19, and the explanation will be omitted.

When the advertisement of the goods is displayed on the message viewer window 62 of the message viewer 76, the user can order the goods only by watching the message viewer window 62 of the message viewer.

Embodiment 8

Figure 21:
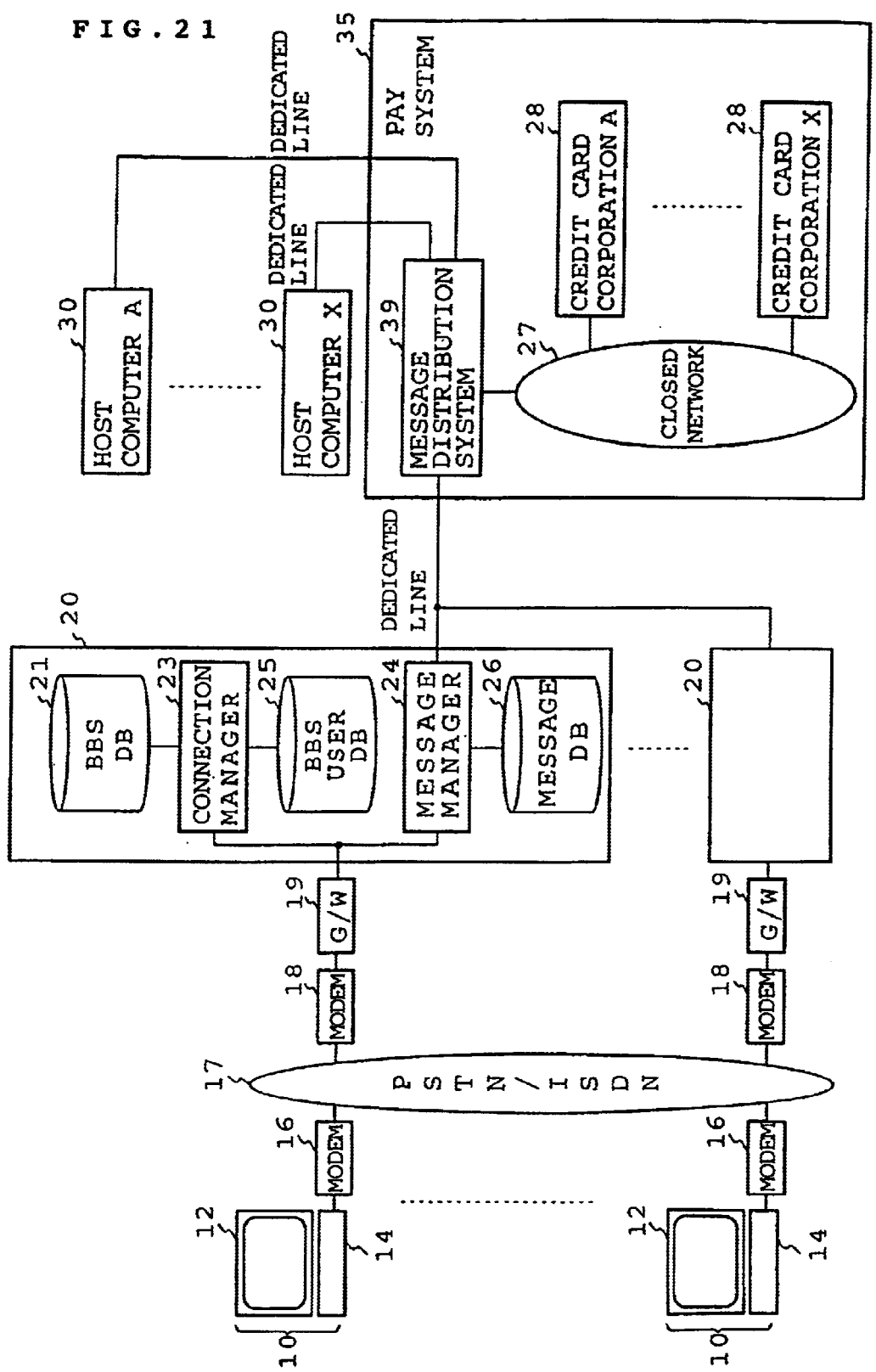
FIG. 21 shows the overall structure of the communication system of the eighth embodiment.

FIG. 21 shows the system structure of the eighth embodiment. In this embodiment, the information provider 20 functions as a BBS, such as Niftyserve™ or Compuserve™. The connection manager 23 is connected to the BBS database 21 which stores information within the BBS, and the provider user database 25 which stores BBS user information. Other structure is the same as the structure shown in FIGS. 2 through 10 in association with the first embodiment. However, in this embodiment, the browser 74 receives the BBS information from the connection manager 23 and displays the information.

FIG. 22 shows the ordering sequence for the goods. When receiving the order request from the browser 74 (S150), the connection manager 23 requests the browser 74 to transmit the mailing address for the goods (S154). When receiving the mailing address from the browser 74 (S158), the connection manager 23 calculates the postage (S170), and transmits the information representing the price of the goods, postage, tax, total amount, mailing address, and time needed for delivery to the browser 74 (S180). The browser 74 displays the received information (S184) and waits for the user is confirmation (S186). The paying sequence is the same as the sixth embodiment (FIG. 19).

Thus, the paying sequence, which follows the ordering operation for the goods through the BBS, is executed by the message distribution system 39.

Others

Although, in the embodiments 1 through 7, the payment system 35 pays for the goods by credit card, the payment system defined by the appended claims covers any system which has a function to pay the store for the goods. For example, the system may transfer money from the user's bank account to the store, or withdraw from the user's account to the bank account of the payment system, and then, transfer to the store.

Although, in the embodiments, the browser 74 displays the home page information of World Wide Web 32, the browser 74 may provide World Wide Web telephone or World Wide Web TV phone which communicates with voice sound through World Wide Web.

Although the 833, the message user database 34, the transmittal condition database 36 and the connection log 38 are shown as independent disc devices, they may be stored in a single disc device. The mutual relationship among the data of the respective fields can be realized by various file structures. For example, the message user database 34, the transmittal condition database 36 and the connection log 38 may be arranged in the different areas of a single file.

The browser window and the message display module window may be arranged in the vertical direction on the display 12. The browser 60 and the message viewer 76 window may be formed as a signal unit, and one window may be divided into two areas. If this is a case, the information received from World Wide Web 32 and the information received form the message manager 24 may be incorporated in a single unit, and the window may be divided into two areas. If this is a case, information received from World Wide Web 32 and information received from the message manager 24 are separately displayed in the respective areas in the signal window.

In the floppy disk 56 or the CD-ROM 58 as an example of the recording medium, a portion or all functions of the operation flow of the terminal 10, which has been described above, can be stored. The floppy disk 56 may store a portion or all function of the other operation flow. These programs may be read out from the recording medium directly to the RAM for implementation.

The recording medium used in the invention may include optical recording medium, such as a DVD, magnetic recording medium, such as an MD, magneto-optical recording medium, such as a PD, tape medium, and semiconductor memory, such as an IC card and a miniature card, other than floppy disk and CD-ROM. These recording medium are used exclusively to manufacture the terminal 10, the message manager 24 or the message distribution system 39. Therefore, it is obvious that make and sale of such recording media will construct infringement against a patent right based on the present invention.

Although the present invention has been described in conjugation with specific embodiments, the present invention is not limited to the embodiments. Many modifications and substitutions are apparent for those skilled in the art without departing from the spirit and the scope of the invention, which is defined by the appended claims.

Even if the user made an order for goods through a host computer, which is connected to an open network, such as World Wide Web, verification of the credit card is executed through a private line without using the open network. This can prevent hacking and improper use of the credit card information.

What is claimed is:

1. A terminal for enabling on-line payment comprising:
    a display which allows multiple windows as part of a graphical user interface, each window comprising a distinct display area having independent control;
    a browser program which communicates with a public hypertext network, the browser comprising:
        means for displaying a browser window on the display,
        means for receiving and processing interactive hypertext images for display and input in the browser window, including interactive hypertext images for permitting a user to order goods from a host computer connected to the public hypertext network, and to display a bill for the goods from the public hypertext network,
    a message viewer program which communicates with a private network, the message viewer program comprising:
        means for displaying a message viewer window on the display,
        means for receiving the bill, and
        means for paying the bill through the private network; and
    communication means for providing a single communication line contemporaneously used by the browser program for communicating with the public hypertext network on a first logical link and the message viewer program for communicating with the private network on a second logical link which is independent of the first logical link.

2. The terminal for enabling on-line payment according to claim 1 wherein:
    the message viewer program further includes:
        means for receiving information indicative of a payment completion from the private network,
        means for transmitting the information indicative of the payment completion to the browser program.

3. A terminal for enabling on-line payment comprising:
    a display which allows multiple windows as part of a graphical user interface, each window comprising a distinct display area having independent control;
    a browser program which communicates with a public hypertext network and comprises means for displaying a browser window on the display;
    a message viewer program which communicates with a private network, the message viewer program comprising:
        means for displaying a message viewer window on the display,
        means for ordering goods through the private network,
        means for receiving a bill for the goods from the private network,
        payment means for paying the bill through the private network, and
        means for transmitting information that the order and the payment have been completed to the browser program;
    communication means for providing a single communication line contemporaneously used by the browser program for communicating with the public hypertext network on a first logical link and the message viewer program for communicating with the private network on a second logical link which is independent of the first logical link.

4. The terminal for enabling on-line payment according to claim 3 wherein the payment means of the message viewer program further includes means for transmitting a credit card number and an expiration date of a user of the terminal to the private network.

5. An information provider for enabling on-line payment, the information provider comprising:
    a gateway through which a terminal accesses a public hypertext network, the gateway comprising:
        means for transmitting a goods order input through the terminal to a host computer connected to the public hypertext network,
        means for transmitting a price information of the goods from the host computer through the public hypertext network to the terminal;
    a connection manager which manages a communication through the gateway;
    a message manager which communicates with the terminal independently from the gateway and is connected to a payment system which enables payments through a private line contemporaneous with the communication through the gateway, the message manager comprising:
        means for receiving the price information from the terminal through the private line,
        request means for sending a request message to the payment system through the private line requesting that the payment system authorize payment of an amount indicated by the price information.

6. The information provider for enabling on-line payment according to claim 5 wherein:
    the message manager further includes means for receiving information indicative of payment completion from the payment system;
    the gateway includes means for notifying the payment completion to the host computer through the public hypertext network.

7. An information provider for enabling on-line payment, the information provider comprising:
    a gateway through which a terminal accesses a public hypertext network;
    a connection manager for managing a communication conducted through the gateway;
    a message manager which communicates with the terminal independently from the gateway and is connected to a payment system which allows payments through a private line contemporaneous with the communication through the gateway, the message manager comprising:
        means for transmitting a goods order, input through the terminal, to the payment system,
        means for transmitting a bill for the goods order from the payment system to the terminal,
        request means for requesting the payment system through the private line to pay the bill,
        means for receiving information indicative of payment completion from the payment system,
        means for notifying the gateway of the information indicative of payment completion;
    wherein the gateway includes means for sending a payment completion message through the public hypertext network to a host computer, the payment completion message notifying the host computer of the payment completion.

8. The information provider for enabling on-line payment according to claim 7 wherein:
the message manager further comprises means for notifying the connection manager of the information indicative of the payment completion;
the connection manager has means for having the gateway send the payment completion message.

9. The information provider for enabling on-line payment according to claim 7 wherein the request means further comprises means for transmitting a credit card number and an expiration date of a credit card held by a user of the terminal to the payment system.

10. A computer-readable recording medium which stores a program for operating on a CPU of a terminal connected to a public network for enabling on-line payment, the program comprising:
a browser module for causing the CPU to communicate with a public hypertext network and for receiving and processing interactive hypertext images for display and input, including interactive hypertext images to
permit a user of the terminal to place an order for goods to a host computer connected to the public hypertext network,
display a bill for the goods from the public hypertext network;
a message viewer module for causing the CPU to communicate with a private network through a logical link which is independent from and contemporaneous with a communication established between the browser module and the public hypertext network, the message viewer module comprising:
means for causing the CPU to receive the bill
means for causing the CPU to execute a payment for the goods using the private network.

11. The recording medium which stores a program for operating on a CPU of a terminal connected to a public network for enabling on-line payment according to claim 10, wherein:
the message viewer module further includes:
means for causing the CPU to receive information indicative of payment completion from the private network,
means for causing the CPU to transmit the payment completion to the browser module.

12. A computer-readable recording medium which stores a program for operating on a CPU of a terminal connected to a public hypertext network for enabling on-line payment, the program comprising:
a browser module for causing the CPU to communicate with the public hypertext network;
a message viewer module for causing the CPU to communicate with a private network independent from and contemporaneous with a communication established between the browser module and the public hypertext network, the message viewer module comprising:
means for causing the CPU to give an order for goods to the private network,
means for causing the CPU to receive a bill for the goods from the private network,
means for causing the CPU to execute payment for the goods through the private network,
means for causing the CPU to indicate that the order and the payment have been completed to the browser module.

13. The recording medium which stores a program for working on CPU of a terminal connected to a public hypertext network for enabling on-line payment according to claim 12 wherein the message viewer module includes means for causing the CPU to transmit a credit card number and an expiration date of a credit card held by a user of the terminal user via the private network during the payment process.

14. A communications system comprising:
a private payment authorization network for providing automated authorization of a given form of payment;
a public computer network having hypertext content and including at least one merchant server system providing HTTP-based commercial transactions across the computer network and accepting the given form of payment;
an information provider having a connection to the private payment authorization network and a gateway to the public computer network;
a terminal comprising:
a display which allows multiple windows as part of a graphical user interface, each window comprising a distinct display area having independent control,
a communications interface for providing a single physical connection to the information provider and supporting plural contemporaneous logical links,
a browser program comprising computer program code for:
making requests of servers on the computer network for hypertext images on behalf of a user of the browser program, wherein the requests are sent through the physical connection,
opening a browser window on the display for displaying the requested images,
receiving the requested images,
displaying the requested images in the browser window,
receiving user input selecting images to receive, wherein the user is able to select at least some images using the hypertext of images shown in the display,
wherein the browser has a first logical link for communicating with the computer network through the single physical connection,
a second program comprising software for:
opening a second window on the display,
after the terminal begins an order transaction with the merchant server system, making a request of the private payment authorization network for authorization of a payment of the given form of payment, wherein the request is sent through the physical connection,
receiving an acknowledgement from the private payment authorization network of the payment,
wherein the second program has a second logical link for communicating with the private payment authorization network through the single physical connection in existence concurrently with the first logical link.

15. The communications system of claim 14 wherein the second program further includes means for transmitting the acknowledgement to the browser program.

16. A terminal for enabling on-line payment and connecting to an information provider, the information provider having a connection to a private payment authorization network and a gateway to a public computer network, the private payment authorization network for providing automated authorization of a given form of payment, the public computer network having hypertext content and including at least one merchant server system providing HTTP-based commercial transactions across the computer network and accepting the given form of payment, the terminal comprising:
- a display which allows multiple windows as part of a graphical user interface, each window comprising a distinct display area having independent control;
- a communications interface for providing a single physical connection to the information provider and supporting plural contemporaneous logical links;
- a browser program comprising computer program code for:
  - making requests of servers on the computer network for hypertext images on behalf of a user of the browser program, wherein the requests are sent through the physical connection,
  - opening a browser window on the display for displaying the requested images,
  - receiving the requested images,
  - displaying the requested images in the browser window,
  - receiving user input selecting images to receive, wherein the user is able to select at least some images using the hypertext of images shown in the display,
  - wherein the browser has a first logical link for communicating with the computer network through the single physical connection;
- a second program comprising software for:
  - opening a second window on the display,
  - after the terminal begins an order transaction with the merchant server system, making a request of the private payment authorization network for authorization of a payment of the given form of payment, wherein the request is sent through the physical connection,
  - receiving an acknowledgement from the private payment authorization network of the payment,
  - wherein the second program has a second logical link for communicating with the private payment authorization network through the single physical connection in existence concurrently with the first logical link.

17. The communications system of claim 16, the second program further including software for transmitting the acknowledgement to the browser program.

18. A terminal for connecting to an information provider, the information provider having a connection to a private payment authorization network and a gateway to a public computer network, the private payment authorization network for providing automated authorization of a given form of payment, the public computer network having hypertext content and including at least one merchant server system providing HTTP-based commercial transactions across the computer network and accepting the given form of payment, the terminal comprising:
- a display which allows multiple windows as part of a graphical user interface, each window comprising a distinct display area having independent control;
- a communications interface for providing a single physical connection to the information provider and supporting plural contemporaneous logical links;
- a browser program comprising:
  - means for making requests of servers on the computer network for hypertext images on behalf of a user of the browser program, wherein the requests are sent through the physical connection,
  - means for opening a browser window on the display for displaying the requested images,
  - means for receiving the requested images,
  - means for displaying the requested images in the browser window,
  - means for receiving user input selecting images to receive, wherein the user is able to select at least some images using the hypertext of images shown in the display,
  - wherein the browser has a first logical link for communicating with the computer network through the single physical connection;
- a second program comprising:
  - means for opening a second window on the display,
  - means for, after the terminal begins an order transaction with the merchant server system, making a request of the private payment authorization network for authorization of a payment of the given form of payment, wherein the request is sent through the physical connection,
  - means for receiving an acknowledgement from the private payment authorization network of the payment,
  - wherein the second program has a second logical link for communicating with the private payment authorization network through the single physical connection in existence concurrently with the first logical link.

* * * * *